(12) United States Patent
Adachi

(10) Patent No.: US 12,501,244 B2
(45) Date of Patent: Dec. 16, 2025

(54) IN-VEHICLE APPARATUS, COMPUTER PROGRAM AND INFORMATION PROCESSING METHOD

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Naoki Adachi, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 291 days.

(21) Appl. No.: 18/250,295

(22) PCT Filed: Aug. 4, 2021

(86) PCT No.: PCT/JP2021/029001
§ 371 (c)(1),
(2) Date: Apr. 24, 2023

(87) PCT Pub. No.: WO2022/185566
PCT Pub. Date: Sep. 9, 2022

(65) Prior Publication Data
US 2024/0007831 A1    Jan. 4, 2024

(30) Foreign Application Priority Data
Mar. 1, 2021    (WO) .................. PCT/JP2021/007673

(51) Int. Cl.
*H04W 4/44*    (2018.01)

(52) U.S. Cl.
CPC ..................................... *H04W 4/44* (2018.02)

(58) Field of Classification Search
CPC ........... H04W 4/44; H04L 12/28; H04L 12/40
See application file for complete search history.

(56) References Cited

U.S. PATENT DOCUMENTS 10,158,717 B2 * 12/2018 Kishikawa .............. H04L 63/20
10,680,847 B2 *  6/2020 Ujiie ................... H04L 63/1466
(Continued)

FOREIGN PATENT DOCUMENTS

JP    2000-346871 A    12/2000
JP    2020-102771 A     7/2020
(Continued)

OTHER PUBLICATIONS

International Search Report, Application No. PCT/JP2021/029001, mailed Oct. 19, 2021. ISA/Japan Patent Office.

*Primary Examiner* — Rasheed Gidado
(74) *Attorney, Agent, or Firm* — Honigman LLP

(57) ABSTRACT

An in-vehicle apparatus configured to be connected to an in-vehicle network installed in a vehicle includes a processing unit that performs processing relating to determining the validity of data flowing through the in-vehicle network. The processing unit receives a plurality of data flowing through the in-vehicle network, derives a reception interval of when data of the same type is received consecutively out of the received plurality of data, and determines, based on the reception interval and a normal cycle range specified on a basis of the reception time point of data received earlier out of the data of the same type received consecutively, the validity of data received later out of the data of the same type received consecutively.

16 Claims, 13 Drawing Sheets

(56) References Cited

U.S. PATENT DOCUMENTS

| | | | |
|---|---|---|---|
| 11,902,370 B2 * | 2/2024 | Krichene | ............ H04L 43/0858 |
| 2015/0066239 A1 | 3/2015 | Mabuchi | |
| 2018/0048663 A1 | 2/2018 | Yura et al. | |
| 2019/0104204 A1 | 4/2019 | Kawakami et al. | |

FOREIGN PATENT DOCUMENTS

| | | |
|---|---|---|
| JP | 2020-129785 A | 8/2020 |
| JP | 2020-145547 A | 9/2020 |

* cited by examiner

| Message ID | Design Cycle | Upper-Lower Limit Value Ratio | Normal Cycle Range | Determination Execution Target Flag |
|---|---|---|---|---|
| 101 | x[ms] | a%(±x*a*0.01[ms]) | k~g ms | 1 |
| 102 | x2 | xx% | k1~g1 ms | 1 |
| 103 | x3 | null | null | 0 |
| 211 | x4 | xx% | k2~g2 ms | 1 |
| 212 | x5 | xx% | k3~g3 ms | 1 |
| . | . | . | . | . |

FIG. 10

| A. Number Of Data Received From Upper Limit Time Point Of Previous Normal Cycle Range To Lower Limit Time Point Of Current Normal Cycle Range | B. Number Of Data Received From Lower Limit Time Point To Upper Limit Time Point Of Current Normal Cycle Range | Determination Of Data Received In A | Determination Of Data Received In B | Reference Data For Specifying Normal Cycle Range | State Of Control Unit |
|---|---|---|---|---|---|
| 0 | 0 | null | Determined To Be Communication Disruption (Loss Of Normal Data, Etc.) | Data Acquired After Upper Limit Time Point Of Current Normal Cycle Range Has Passed | Transition To Reference Data Reception State |
| 0 | 1 | null | Determined To Be Normal | Data Received In B | Maintain Determination Execution State |
| 0 | ≥2 | null | Determined To Be Anomalous (Range) | Data Acquired After Upper Limit Time Point Of Current Normal Cycle Range Has Passed | Transition To Reference Data Reception State |
| ≥1 | 0 | Determined To Be Anomalous (Specific) | Determined To Be Communication Disruption (Loss Of Normal Data, Etc.) | Data Acquired After Upper Limit Time Point Of Current Normal Cycle Range Has Passed | Transition To Reference Data Reception State |
| ≥1 | 1 | Determined To Be Anomalous (Specific) | Determined To Be Normal | Data Received In B | Maintain Determination Execution State |
| ≥1 | ≥2 | Determined To Be Anomalous (Specific) | Determined To Be Anomalous (Range) | Data Acquired After Upper Limit Time Point Of Current Normal Cycle Range Has Passed | Transition To Reference Data Reception State |

IN-VEHICLE APPARATUS, COMPUTER PROGRAM AND INFORMATION PROCESSING METHOD

CROSS-REFERENCE TO RELATED APPLICATIONS

This application is the U.S. national stage of PCT/JP2021/029001 filed on Aug. 4, 2021, which claims priority of International Application No. PCT/JP2021/007673 filed on Mar. 1, 2021, the entire contents of which are hereby incorporated by reference.

TECHNICAL FIELD

The present disclosure relates to an in-vehicle apparatus, a computer program and an information processing method.

BACKGROUND

Conventionally, CAN communication protocols have been widely employed in communication between multiple in-vehicle ECUs (Electronic Control Units) installed in a vehicle. As vehicles become more multifunctional and sophisticated, the number of in-vehicle ECUs that are installed tends to increase. The in-vehicle ECUs are divided into groups (segments) to constitute a vehicle network, and the plurality of in-vehicle ECUs in the same group are connected by a common communication line and perform transmission and reception of data between each other, with transmission and reception of data between the in-vehicle ECUs of different groups being relayed by an in-vehicle relay device (gateway) (e.g., JP 2013-131907A).

In addition to the in-vehicle relay device (gateway), the vehicle network of JP 2013-131907A includes a vehicle network monitoring device that is connected to each segment of the vehicle network and detects unauthorized data (messages) flowing through the vehicle network. When unauthorized data (message) is detected, the vehicle network monitoring device transmits alert information (message code) to an in-vehicle control device (in-vehicle ECU).

There is a problem with the vehicle network monitoring device of JP 2013-131907A in that consideration is not given to efficiently detecting unauthorized messages from messages transmitted cyclically, based on the transmission cycle of the messages.

An object of the present disclosure is to provide an in-vehicle apparatus and the like that are able to efficiently detecting unauthorized data from data transmitted cyclically, based on the transmission cycle of the data.

SUMMARY

An in-vehicle apparatus according to one mode of the present disclosure is an in-vehicle apparatus that is configured to be connected to an in-vehicle network installed in a vehicle, and includes a processing unit configured to perform processing relating to determining a validity of data flowing through the in-vehicle network. The processing unit receives a plurality of data flowing through the in-vehicle network, derives a reception interval of when data of a same type is consecutively received, out of the received plurality of data, and determines, based on the reception interval and a normal cycle range specified on a basis of a reception time point of data received earlier out of the data of the same type received consecutively, the validity of data received later out of the data of the same type received consecutively.

Advantageous Effects of Disclosure

According to one mode of the present disclosure, an in-vehicle apparatus and the like can be provided that efficiently detect unauthorized data from data transmitted cyclically, based on the transmission cycle of the data.

BRIEF DESCRIPTION OF DRAWINGS

FIG. 10 is an illustrative diagram relating to modes of determination by the processing unit of the in-vehicle apparatus.

DETAILED DESCRIPTION OF PREFERRED EMBODIMENTS

Figure 1:
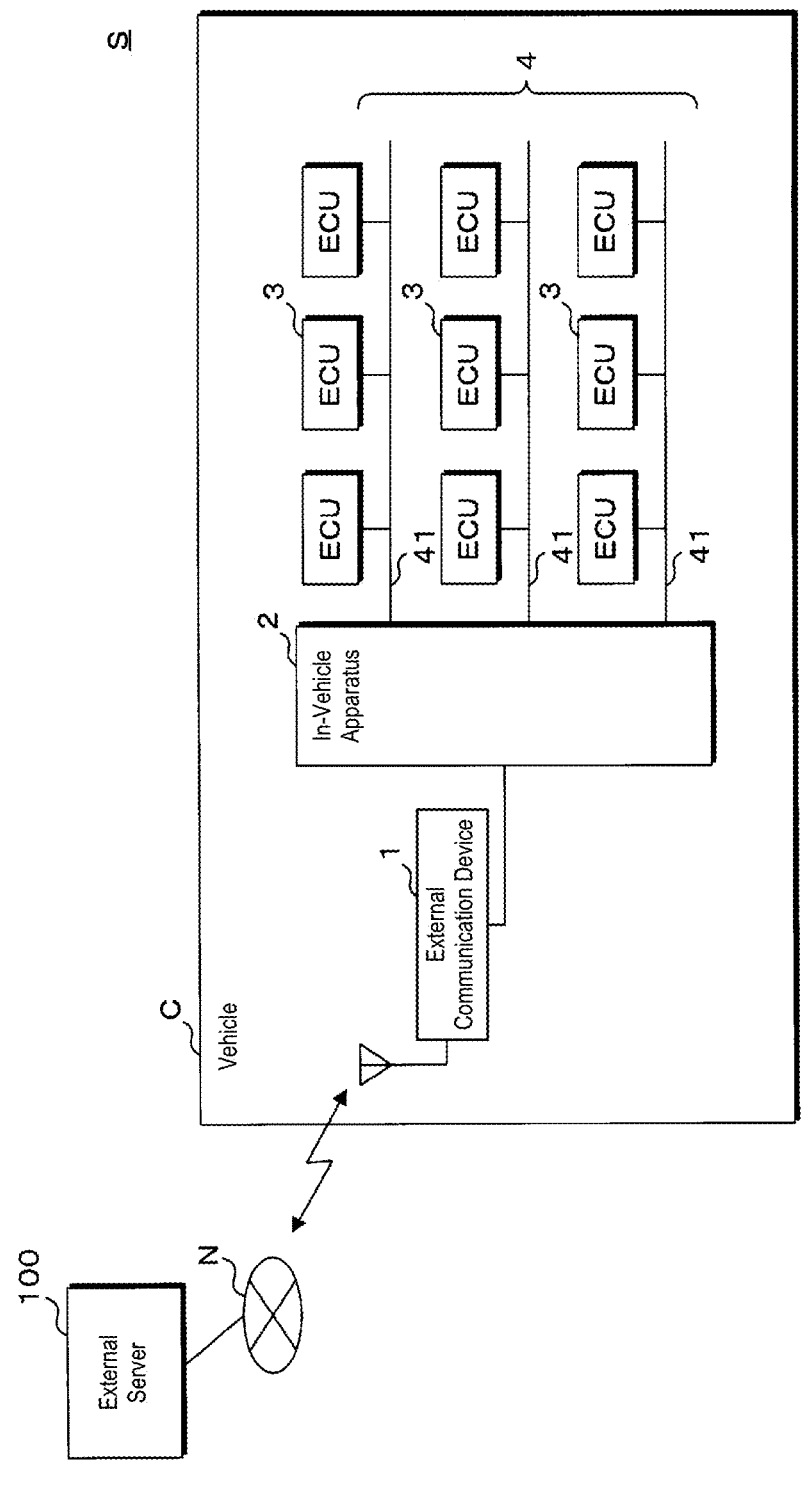
FIG. 1 is a schematic diagram illustrating a configuration of an in-vehicle system that includes an in-vehicle apparatus according to Embodiment 1.

Initially, modes of the present disclosure will be enumerated and described. Also, at least some of the embodiments described below may be freely combined.

First Aspect

In accordance with a first aspect, an in-vehicle apparatus according to one mode of the present disclosure is an in-vehicle apparatus that is configured to be connected to an in-vehicle network installed in a vehicle, and includes a processing unit configured to perform processing relating to determining a validity of data flowing through the in-vehicle network. The processing unit receives a plurality of data flowing through the in-vehicle network, derives a reception interval of when data of a same type is consecutively received, out of the received plurality of data, and determines, based on the reception interval and a normal cycle range specified on a basis of a reception time point of data received earlier out of the data of the same type received consecutively, the validity of data received later out of the data of the same type received consecutively.

With this mode, the processing unit of the in-vehicle apparatus receives (acquires) a plurality of data such as CAN messages transmitted by in-vehicle ECUs that are connected to an in-vehicle network. If the plurality of data includes data of the same type having the same CAN-ID (message ID), for example, and data of the same type is consecutively received, the processing unit derives a reception interval which is the interval between the reception time point of the data received earlier and the reception time point of the data received later. Since the validity of the data received later (data of the same type as the data received earlier) is determined based on the reception interval and the normal cycle range that is specified on the basis of the reception time point of the data received earlier, the processing unit efficiently detects unauthorized messages from messages transmitted cyclically, based on the transmission cycle of the messages. Since the normal cycle range is specified on the basis of the reception time point of the data received earlier out of two pieces of data of the same type received consecutively, the validity determination of the data received later can be appropriately performed, based on this normal cycle range, even if the reception time point of the data received earlier varies with respect to a reception time point fixedly determined from the start time point of the transmission cycle of the data.

Second Aspect

In a second aspect, in the in-vehicle apparatus according to one mode of the present disclosure, the normal cycle range may be a range in which upper and lower limit values are set, with a transmission cycle determined based on a type of the data set as a reference value.

With this mode, the processing unit of the in-vehicle apparatus specifies the normal cycle range, by taking the transmission cycle (design cycle) that is determined based on the type of data as a reference value, and setting the upper and lower limit values with the reference value as a middle value, for example. In data such as CAN messages transmitted from the in-vehicle ECUs, the transmission cycle in which data of the same type having the same CAN-ID (message ID) is transmitted is determined in advance by the type (message ID) of the data, for example. However, the timing at which data is transmitted or received shifts, according to the network load of the in-vehicle network, the computational load of the in-vehicle ECUs, or the processing load of the in-vehicle relay device, and transmission or reception of data that deviates from the transmission cycle occurs. In view of this, the processing unit of the in-vehicle apparatus takes the transmission cycle as a reference value (e.g., middle value), and takes a range whose upper limit and lower limit are respectively values obtained by adding and subtracting a time period corresponding to a predetermined ratio (upper-lower limit value ratio) such as a %, for example, of the transmission cycle as the normal cycle range. Variation such as delay in the data reception timing that is affected by the network load of the in-vehicle network and the like can thereby be absorbed to improve robustness, and enable improvement in the accuracy of the validity determination of data to be achieved.

Third Aspect

In a third aspect, in the in-vehicle apparatus according to one mode of the present disclosure, the processing unit may determine that the data received later out of the data of the same type received consecutively is normal, if the reception interval is within the normal cycle range specified on a basis of the reception time point of the data received earlier out of the data of the same type received consecutively, and determine that the data received later out of the data of the same type received consecutively is anomalous, if the reception interval is not within the normal cycle range.

With this mode, the processing unit determines that the data received later is normal, if the reception interval between two pieces of data of the same type received consecutively is within the normal cycle range, and that the data received later is anomalous, if the reception interval is not within the normal cycle range, that is, if the reception interval is outside the normal cycle range, and is thus able to efficiently perform validity determination of data. Since the normal cycle range is a range whose upper and lower limit values are set at time points obtained by adding the transmission cycle that is determined based on the type of data to the reception time point of the data received earlier, for example, the reception interval being within the normal cycle range means that the reception time point of the data received later is located between the lower limit time point (limit-low) and the upper limit time point (limit-upp) that are determined by the normal cycle range. The reception interval being outside the normal cycle range means that the reception time point of the data received later is not located between the lower limit time point (limit-low) and the upper limit time point (limit-upp) that are determined by the normal cycle range, and is, for example, a time point before the lower limit time point (limit-low). Since validity determination of the data received later is thus performed, based on whether the reception interval is inside or outside the normal cycle range that is specified on the basis of the reception time point of the data received earlier, it can be efficiently determined whether the data received later is authorized.

Fourth Aspect

In a fourth aspect, in the in-vehicle apparatus according to one mode of the present disclosure, if data of the same type is not received within the normal cycle range, the processing unit may specify a next normal cycle range on a basis of the reception time point of data of the same type received after the normal cycle range.

With this mode, if data of the same type is not received within the normal cycle range, that is, if data of the same type as the earlier data is not received between the lower limit time point (limit-low) and the upper limit time point (limit-upp) that are determined by the normal cycle range, it is conceivable that communication was interrupted due to data that was originally to be transmitted or received being lost (missing) due to the network load or the like. In view of this, the processing unit of the in-vehicle apparatus specifies the normal cycle range on the basis of the reception time point of data (same type of data as earlier data) received after the normal cycle range, that is, after the upper limit time point (limit-upp) determined by the normal cycle range. By receiving (reacquiring) data that will serve as a basis for specifying the normal cycle range, the validity determination processing of data received after the data is received (reacquired) can thereby be efficiently resumed, even if communication is disrupted due to loss of data (missing data) or the like. The processing unit of the in-vehicle apparatus is thus able to prevent data received after the normal cycle range being misdetected as anomalous data despite being normal data, by specifying the normal cycle range on the basis of the reception time point of the data, rather than uniformly determining that data received after the normal cycle range is anomalous data.

Fifth Aspect

In a fifth aspect, in the in-vehicle apparatus according to one mode of the present disclosure, if one piece of data of the same type is received within the normal cycle range, the processing unit may determine that the one piece of data received within the normal cycle range is normal, and, if a plurality of data of the same type are received within the normal cycle range, the processing unit may determine that one or more of the data included in the plurality of data received within the normal cycle range are anomalous.

With this mode, since the transmission cycle for when a plurality of data of the same type are transmitted sequentially is determined in advance based on the type of the data, the number of data (data of same type as earlier data) received within the normal cycle range, that is, between the lower limit time point (limit-low) and the upper limit time point (limit-upp) that are determined by the normal cycle range, is originally one. In view of this, if the number of data of the same type received within the normal cycle range is more than one, the plurality of data will include anomalous data. Thus, if a plurality of data of the same type are received within the normal cycle range, the processing unit of the in-vehicle apparatus determines that anomalous data is included within this range, and is thereby able to efficiently perform anomaly detection in a range during a predetermined reception period (range anomaly detection).

Sixth Aspect

In a sixth aspect, in the in-vehicle apparatus according to one mode of the present disclosure, if a plurality of data of the same type are received within the normal cycle range, the processing unit may specify the next normal cycle range on a basis of the reception time point of data of the same type received after the normal cycle range.

With this mode, if the number of data (same type of data as earlier data) that is received within the normal cycle range, that is, between the lower limit time point (limit-low) and the upper limit time point (limit-upp) that are determined by the normal cycle range, is a plurality, being two or more, the processing unit of the in-vehicle apparatus specifies the normal cycle range to be used in the next determination processing on the basis of the reception time point of data of the same type received after the normal cycle range (after the upper limit time point (limit-upp)). That is, the processing unit of the in-vehicle apparatus determines that the plurality of data received within the normal cycle range includes at least one or more pieces of anomalous data, and does not use any of the plurality of data as reference data for specifying the normal cycle range to be used in subsequent determination processing. The processing unit of the in-vehicle apparatus specifies the normal cycle range to be used in subsequent determination processing on the basis of the reception time point of data of the same type received after the upper limit time point of the normal cycle range determined in this way, and is thus able to efficiently continue (resume) the validity determination of data, even if an anomaly is detected in a range during a predetermined reception period (range anomaly detected).

Seventh Aspect

In a seventh aspect, in the in-vehicle apparatus according to one mode of the present disclosure, if data of the same type as the data received earlier is received between a previous normal cycle range used in determination of the data received earlier and a current normal cycle range specified on a basis of the reception time point of the data received earlier, the processing unit may determine that the data of the same type is anomalous.

With this mode, a plurality of data that are the same type are transmitted sequentially according to a transmission cycle (design cycle) determined in advance, and the processing unit of the in-vehicle apparatus, upon sequentially receiving the plurality of data, specifies, on the basis of data that is received, the normal cycle range for performing validity determination of data that is received next. Accordingly, the normal cycle range is specified sequentially, according to the plurality of data received sequentially. If, between the normal cycle range (previous normal cycle range) used in determination of data received earlier and the normal cycle range (current normal cycle range) specified on the basis of the reception time point of the data received earlier, data of the same type as the earlier data is received, the processing unit of the in-vehicle apparatus determines that the data of the same type is anomalous (specifically anomalous data detected). That is, if data of the same type as the data received earlier is received between the upper limit time point (limit-upp) that is determined by the previous normal cycle range and the lower limit time point (limit-low) that is determined by the current normal cycle range, the processing unit of the in-vehicle apparatus determines that the data of the same type is anomalous. By using such determination logic, the processing unit of the in-vehicle apparatus is able to efficiently determine that data received outside the normal cycle range is anomalous.

Eighth Aspect

In an eighth aspect, in the in-vehicle apparatus according to one mode of the present disclosure, if one piece of data of the same type as the data received earlier is received within the normal cycle range specified on a basis of the reception time point of the data received earlier, the processing unit may determine that the data of the same type is normal, and specify the next normal cycle range on a basis of the reception time point of the data determined to be normal.

With this mode, if data of the same type as the data received earlier is received between the upper limit time point (limit-upp) that is determined by the previous normal cycle range and the lower limit time point (limit-low) that is determined by the current normal cycle range, the processing unit of the in-vehicle apparatus determines that the data of the same type is anomalous. Furthermore, if one piece of data of the same type is received within the normal cycle range specified on the basis of the reception time point of the data received earlier, that is, within the current normal cycle range, the processing unit of the in-vehicle apparatus determines that the data of the same type is normal. When performing this various determination processing, the processing unit of the in-vehicle apparatus may be configured to count the number of data of the same type received between the upper limit time point (limit-upp) of the previous normal cycle range and the upper limit time point (limit-upp) of the current normal cycle range, and perform validity determination of the individual data, based on the reception interval of the respective data of the same type that were counted.

Ninth Aspect

In a ninth aspect, in the in-vehicle apparatus according to one mode of the present disclosure, the processing unit may transition between a plurality of operating states, and the plurality of operating states may include a reference data reception state for receiving data to serve as a basis when specifying the normal cycle range, and a determination execution state for determining the validity of received data based on the specified normal cycle range.

With this mode, in the period before any data is initially (first) received after the IG switch of the vehicle is turned on, or in the case where subsequent data that is determined to be normal is not received within the normal cycle range, for example, the processing unit of the in-vehicle apparatus transitions to a reference data reception state for waiting to receive data (reference data) that will serve as a basis for specifying the normal cycle range. The processing unit, having transitioned to the reference data reception state, continues to wait for receipt of data, in order to receive data (reference data) that will serve as a basis for specifying the normal cycle range. After receiving data (reference data) that will serve as a basis for specifying the normal cycle range, the processing unit of the in-vehicle apparatus transitions to the determination execution state for determining the validity of the received data based on the specified normal cycle range. Thus, by transitioning between a plurality of operation states including the reference data reception state and the determination execution state, according to data validity determination and the like, the processing unit of the in-vehicle apparatus is able to efficiently receive data (reference data) that will serve as a basis for use in subsequent processing, and to efficiently specify the normal cycle range based on this reference data.

Tenth Aspect

In a tenth aspect, in the in-vehicle apparatus according to one mode of the present disclosure, the processing unit may not perform anomaly detection in the reference data reception state.

With this mode, the processing unit of the in-vehicle apparatus transitions to the reference data reception state, and, in the reference data reception state, does not perform anomaly detection, due to processing relating to anomaly detection such as validity determination of received data and the like being prohibited. Due to anomaly detection thus being prohibited in the reference data reception state, relay processing such as transferring received data to another communication line (CAN bus) in accordance with a routing map can be efficiently performed, while reliably suppressing the occurrence of misdetection with respect to the received data.

Eleventh Aspect

In an eleventh aspect, in the in-vehicle apparatus according to one mode of the present disclosure, the processing unit may not save a security log in the reference data reception state.

With this mode, the processing unit of the in-vehicle apparatus transitions to the reference data reception state, and, in the reference data reception state, does not perform processing for saving (storing) security logs (attack detection log data) that are based on detection results obtained in the determination execution state to a storage unit. Thus, in the reference data reception state, the processing load on the processing unit of the in-vehicle apparatus can be reduced, by not saving security logs.

Twelfth Aspect

In a twelfth aspect, in the in-vehicle apparatus according to one mode of the present disclosure, if it is determined that the received data is anomalous, the processing unit may store information that depends on a mode of the anomaly in an accessible predetermined storage area.

With this mode, if it is determined that the received data is anomalous, the processing unit of the in-vehicle apparatus outputs information that depends on the mode of the anomaly or stores this information in a predetermined storage area accessible by the processing unit, thus enabling the operator of the vehicle or the like to be efficiently informed that the anomaly has occurred.

Thirteenth Aspect

In a thirteenth aspect, the in-vehicle apparatus according to one mode of the present disclosure, the accessible predetermined storage area may be a volatile storage area, and, when an IG switch of the vehicle is turned off, the processing unit may transfer the information stored in the volatile storage area to an accessible predetermined nonvolatile storage area.

With this mode, the predetermined storage area accessible by the processing unit of the in-vehicle apparatus includes, for example, a volatile storage area such as RAM and a nonvolatile storage area such as flash memory, and, if the received data is determined to be anomalous, the processing unit of the in-vehicle apparatus stores information that depends on the mode of the anomaly in the storage area. When the IG switch is turned off, the processing unit of the in-vehicle apparatus transfers (saves) information stored in a volatile storage area (information that depends on the mode of the anomaly) to a nonvolatile storage area, by saving (copying) the information to the nonvolatile storage area, triggered by the off signal, for example. Even if the IG switch is turned off and the information in the volatile storage area is erased, information that depends on the mode of the anomaly can thereby be saved to a nonvolatile storage area. When storing information that depends on the mode of the anomaly in the volatile storage area, the processing unit of the in-vehicle apparatus may be configured to store the information as a log of when the anomaly was detected. At this time, the processing unit of the in-vehicle apparatus may be configured to determine an upper limit value of the number of logs to be stored (saved), and, if the number of logs to be saved exceeds the upper limit value, the most recent log may be saved by overwriting the oldest log. The upper limit value may be changed, according to the type (CAN message ID) of data to undergo anomaly detection. Alternatively, an upper limit value may be set for all types of data. By performing overwrite processing that is based on such an upper limit value, it is possible to keep the storage capacity that is required for the volatile storage area or the nonvolatile storage area from becomes excessively large.

Fourteenth Aspect

In a fourteenth aspect, in the in-vehicle apparatus according to one mode of the present disclosure, when specifying the normal cycle range on a basis of the reception time point of received data, the processing unit may store the type and reception time point of the data serving as the basis in association with each other in an accessible predetermined storage area.

With this mode, when specifying the normal cycle range on a basis of the reception time point of received data, the processing unit of the in-vehicle apparatus outputs the type and reception time point of the data serving as the basis in association with each other, or stores the type and reception time point in a predetermined storage area accessible by the processing unit.

Fifteenth Aspect

In a fifteenth aspect, in the in-vehicle apparatus according to one mode of the present disclosure, when an IG switch of the vehicle is turned on, the processing unit may consecutively receive, after a predetermined diagnostic mask period has elapsed, data initially received and data of the same type as the data initially received, and if the reception interval of the consecutively received data is within the normal cycle range specified on a basis of the data initially received, the processing unit may specify the next normal cycle range on a basis of the reception time point of the data received later out of the consecutively received data.

With this mode, the processing unit of the in-vehicle apparatus specifies reference data for specifying the normal cycle range, after the diagnostic mask period has elapsed from when the IG switch is turned on. In the diagnostic mask period, anomaly detection is not performed on the in-vehicle apparatus that is installed in the vehicle. If the reception interval between the data initially received after the diagnostic mask period has elapsed and the data (data received later) of the same type received directly after the initial data, that is, the reception interval of data received consecutively, is within the normal cycle range specified on the basis of the data initially received, the processing unit of the in-vehicle apparatus specifies the next normal cycle range on the basis of the reception time point of the data received later. Thus, after the elapse of the diagnostic mask period, the processing unit of the in-vehicle apparatus specifies the data received later as reference data for specifying the next normal cycle range, based on two pieces of data of the same type received consecutively consisting of the data initially received and data of the same type received directly after the initial data. The appropriateness of the validity determination of data received thereafter can thereby be improved. The processing unit of the in-vehicle apparatus may be configured to store the two pieces of data of the same type received consecutively (data initially received and data received later) in the storage unit.

Sixteenth Aspect

In a sixteenth aspect, a computer program according to one mode of the present disclosure is a computer program for causing a computer to execute processing for receiving a plurality of data flowing through an in-vehicle network installed in a vehicle, deriving a reception interval of when data of a same type is consecutively received, out of the received plurality of data, and determining, based on the reception interval and a normal cycle range specified on a basis of a reception time point of data received earlier out of the data of the same type received consecutively, a validity of data received later out of the data of the same type received consecutively.

With this mode, a computer can be caused to operate as an in-vehicle apparatus that efficiently detects unauthorized data from data transmitted cyclically, based on the transmission cycle.

Seventeenth Aspect

In a seventeenth aspect, an information processing method according to one mode of the present disclosure is an information processing method for causing a computer to execute processing for receiving a plurality of data flowing through an in-vehicle network installed in a vehicle, deriving a reception interval of when data of a same type is consecutively received, out of the received plurality of data, and determining, based on the reception interval and a normal cycle range specified on a basis of a reception time point of data received earlier out of the data of the same type received consecutively, a validity of data received later out of the data of the same type received consecutively.

With this mode, an information processing method can be provided that causes a computer to operate as an in-vehicle apparatus that efficiently detects unauthorized data from data transmitted cyclically, based on the transmission cycle.

The present disclosure will be specifically described based on drawings showing embodiments thereof. An in-vehicle apparatus 2 according to embodiments of the present disclosure will be described below with reference to the drawings. Note that the present disclosure is not limited to these illustrative examples and is defined by the claims, and all changes that come within the meaning and range of equivalency of the claims are intended to be embraced therein.

Embodiment 1

Figures 2, 3:
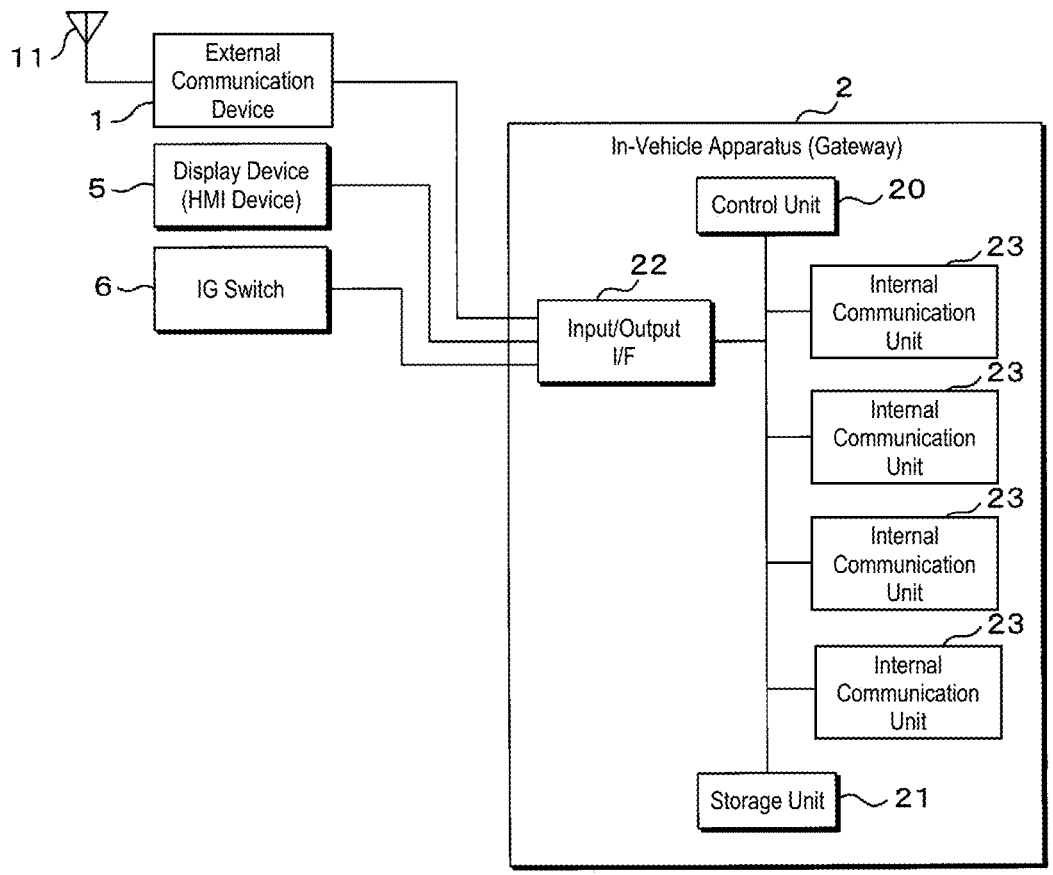
FIG. 2 is a block diagram illustrating a physical configuration of the in-vehicle apparatus.
FIG. 3 is an illustrative diagram relating to a data type table.

Hereinafter, an embodiment will be described based on the drawings. FIG. 1 is a schematic diagram illustrating a configuration of an in-vehicle system including the in-vehicle apparatus 2 according to Embodiment 1. FIG. 2 is a block diagram illustrating the physical configuration of the in-vehicle apparatus 2.

An in-vehicle system S includes the in-vehicle apparatus 2 and a communication device 1 for external communication that are installed in the vehicle. The in-vehicle apparatus 2 relays communication between a plurality of in-vehicle ECUs 3 that are installed in the vehicle. The in-vehicle apparatus 2 may be configured to communicate via the external communication device 1 with an external server 100 connected via an external network N, and to relay communication between the external server 100 and the in-vehicle ECUs 3 that are installed in the vehicle.

The external server 100 is a computer such as a server that is connected to the external network N such as the Internet or a public network, for example, and includes a storage unit or storage device that is realized by RAM (Random Access Memory), ROM (Read Only Memory), a hard disk, or the like. The storage unit or the like of the external server 100 is included in a storage area accessible by the in-vehicle apparatus 2.

A vehicle C is equipped with the external communication device 1, the in-vehicle apparatus 2, a display device 5, and a plurality of in-vehicle ECUs 3 for controlling various in-vehicle devices. The in-vehicle apparatus 2 and the external communication device 1 are communicably connected by a wire harness such as a serial cable, for example. The in-vehicle apparatus 2 and the in-vehicle ECUs 3 are communicably connected by communication lines 41 and in-vehicle network 4 that support a communication protocol such as CAN (Control Area Network; registered trademark) or Ethernet (registered trademark). The in-vehicle apparatus 2 and the in-vehicle ECUs 3 may also be configured to support communication protocols such as LIN, MOST, FlexRay and the like.

The external communication device 1 includes an external communication unit (not shown) and an input/output I/F (not shown) for communicating with the in-vehicle apparatus 2. The external communication unit is a communication device for performing wireless communication using mobile communication protocols such as 3G, LTE, 4G and WiFi, and performing data transmission and reception with the external server 100 via an antenna 11 connected to the external communication unit. Communication between the external communication device 1 and the external server 100 is performed via the external network N such as a public network or the Internet, for example. The input/output I/F is a communication interface for performing serial communication, for example, with the in-vehicle apparatus 2. The external communication device 1 and the in-vehicle apparatus 2 communicate with each other via the input/output I/F and a wire harness such as a serial cable connected to the input/output I/F. In the present embodiment, the external communication device 1 is a separate apparatus from the in-vehicle apparatus 2, and these devices are communicably connected by the input/output I/F and the like, but is not limited thereto. The external communication device 1 may be built into the in-vehicle apparatus 2 as a constituent part of the in-vehicle apparatus 2.

The in-vehicle apparatus 2 includes a processing unit 20, a storage unit 21, an input/output I/F 22, and an internal communication unit 23. The in-vehicle apparatus 2 is an in-vehicle relay device such as a gateway (CAN gateway) that integrates segments of a system formed by a plurality of communication lines 41 of recognition-related in-vehicle ECUs 3, determination-related in-vehicle ECUs 3, and operation-related in-vehicle ECUs 3, and relays communication of the in-vehicle ECUs 3 between these segments. The plurality of communication lines 41 each corresponds to a bus (CAN bus) in each segment. The in-vehicle apparatus 2 may be an in-vehicle relay device such as Ethernet SW, a PLB (Power Lan Box) having a power distribution function in addition to a data communication relay function, and an integrated ECU having a relay function and integrally controlling the entire vehicle C. Also, the in-vehicle apparatus 2 may be constituted as a functional unit of the in-vehicle ECUs 3, such as a body ECU that controls a body-related actuator of the vehicle C.

The processing unit 20 is constituted by a CPU (Central Processing Unit), an MPU (Micro Processing Unit) or the like, and is configured to perform various control processing, computational processing and the like, by reading out a control program and data stored in advance in the storage unit 21 and executing the control program and using the data. The processing unit 20 may also be configured to function as a control unit that determines the validity of data (messages) acquired (received) via the internal communication unit 23 and performs overall control of the in-vehicle apparatus 2.

The storage unit 21 is constituted by a volatile memory device such as RAM (Random Access Memory) or a non-volatile memory device such as ROM (Read Only Memory), EEPROM (Electrically Erasable Programmable ROM) or flash memory, and the control program and data that is referred to during processing are stored in advance. The control program stored in the storage unit 21 may be a control program read out from a recording medium 211 that is readable by the in-vehicle apparatus 2. Also, the control program may be downloaded from an external computer (not shown) connected to a communication network (not shown) and stored in the storage unit 21.

The storage unit 21 stores relay route information (routing table) that is used when performing relay processing for communication between the in-vehicle ECUs 3 or communication between the in-vehicle ECUs 3 and the external server 100. The format of the relay route information is determined based on the communication protocol. If the communication protocol is CAN, relay route information for CAN includes a message identifier (CAN-ID, message ID) that is included in the CAN message and a relay destination associated with the CAN-ID (I/O port number of internal communication unit 23).

The input/output I/F 22 is a communication interface for performing serial communication, for example, similar to the input/output I/F of the external communication device 1. For example, via the input/output I/F 22, the in-vehicle apparatus 2 is communicably connected to the external communication device 1, the display device 5 (HMI apparatus), and an IG switch 6 that starts and stops the vehicle C.

The internal communication unit 23 is an input/output interface that uses the CAN (Control Area Network), CAN-FD (CAN with Flexible Data Rate) or Ethernet (registered trademark) communication protocol, for example, and the processing unit 20 communicates with the in-vehicle ECUs 3 or other in-vehicle devices such as the relay device that are connected to the in-vehicle network 4 via the internal communication unit 23.

A plurality of internal communication units 23 are provided, and the communication lines 41 (CAN buses, etc.) constituting the in-vehicle network 4 are connected one-to-one to the internal communication units 23. Due to a plurality of internal communication units 23 being provided in this way, the in-vehicle network 4 may be divided into a plurality of segments. The topology type of the in-vehicle network 4 is not limited to a bus topology such as shown in the present embodiment, and the topology type may, for example, be a star topology centered on the in-vehicle apparatus 2, a ring topology formed by a plurality of in-vehicle apparatuses 2, or a cascade topology with the in-vehicle apparatus 2 at the top.

The in-vehicle ECUs 3 each include a control unit (not shown), a storage unit (not shown) and an internal communication unit (not shown), similarly to the in-vehicle apparatus 2. The storage unit is constituted by a volatile memory device such as RAM (Random Access Memory) or a non-volatile memory device such as ROM (Read Only Memory), EEPROM (Electrically Erasable Programmable ROM) or flash memory, and stores data or programs of the in-vehicle ECU 3. The in-vehicle ECUs 3 transmit CAN messages cyclically and communicate with the in-vehicle apparatus 2, for example. The in-vehicle ECUs 3 may be individual ECUs to which a sensor or actuator is connected and that are connected under an integrated ECU.

The display device 5 is an HMI (Human Machine Interface) device such as a car navigation display, for example. The display device 5 is communicably connected to the input/output I/F 22 of the in-vehicle apparatus 2 by a harness such as a serial cable. The display device 5 displays data or information output by the processing unit 20 of the in-vehicle apparatus 2 via the input/output I/F 22.

FIG. 3 is an illustrative diagram relating to a data type table. Various data that is referred to by the processing unit 20 when performing determination processing is stored in a predetermined storage area accessible by the processing unit 20, such as the storage unit 21 of the in-vehicle apparatus 2, or the storage device that is connected to the in-vehicle ECUs 3 or the external server 100. Data types to be monitored when the processing unit 20 performs the determination processing are stored in the storage unit 21 or the like as a data type table configured in table format, for example.

Management items (fields) that are defined in the data type table include message ID, design cycle, upper-lower limit value ratio, normal cycle range, and determination execution target flag, for example.

A message ID (CAN-ID) indicating the type of CAN message, for example, is stored in the message ID management item (field). The type of data to be received is determined, based on this message ID. If the data to undergo validity determination is a CAN message, for example, processing is performed with CAN messages having the same message ID taken as data of the same type.

The management items (fields) for determining the type of data are not limited to the message ID in CAN messages, and, in the case of TCP/IP packets, may be a source IP address, a destination IP address, a TCP port number, a UDP port number or a combination thereof included in the packet.

The design cycle indicates a transmission cycle determined in advance, when data (messages) is transmitted from one of the in-vehicle ECUs 3 or the like, that is, a transmission cycle that is based on design specifications of an application or the like that is implemented in the in-vehicle ECU 3. The design cycle management item (field) stores the design cycle (e.g., x [ms]) of individual data.

The upper-lower limit value ratio indicates the upper and lower limit values for specifying the normal cycle range based on the design cycle. The upper-lower limit value ratio may, for example, be defined as a ratio of the design cycle (e.g., a %, where a>0), or may be indicated with an actual time (±xx a×0.01 [ms]). Alternatively, the upper-lower limit value ratio may differ between the upper limit and lower limit.

The normal cycle range is a range that is calculated using the design cycle and the upper-lower limit value ratio, and is information that is used when determining the validity of received data. For example, if the design cycle is x [ms] and the upper-lower limit value ratio is a % (±xx a×0.01 [ms]), the normal cycle range will be from x−xx a×0.01 [ms] to x+xx a×0.01 [ms]. In the case where the reception time point of the reference data that serves as a basis when specifying the normal cycle range is given as (Kms), the middle value of the normal cycle range will be (K+x) ms, the lower limit time point (limit-low) of the normal cycle range will be {(K+x)−(xx a×0.01)} ms, and the upper limit time point (limit-upp) of the normal cycle range will be {(K+x)+(xx a×0.01)} ms. In the present embodiment, the data type table includes both the normal cycle range and the design cycle and upper-lower limit value ratio, but is not limited thereto, and may, needless to say, include only the normal cycle range or the design cycle and upper-lower limit value ratio.

The determination execution target flag stores a flag value (1: monitoring target, 0: non-monitoring target) for determining which types of data are execution targets for validity determination (monitoring targets), out of the data transmitted and received over the in-vehicle network 4. By thus taking data of the types for which the determination execution target flag is set as execution targets for validity determination (monitoring targets), out of data transmitted and received over the in-vehicle network 4, only data having a relatively high degree of importance will be taken as monitoring targets, enabling the processing load of the in-vehicle apparatus 2 (processing unit) to be reduced.

Figure 4:
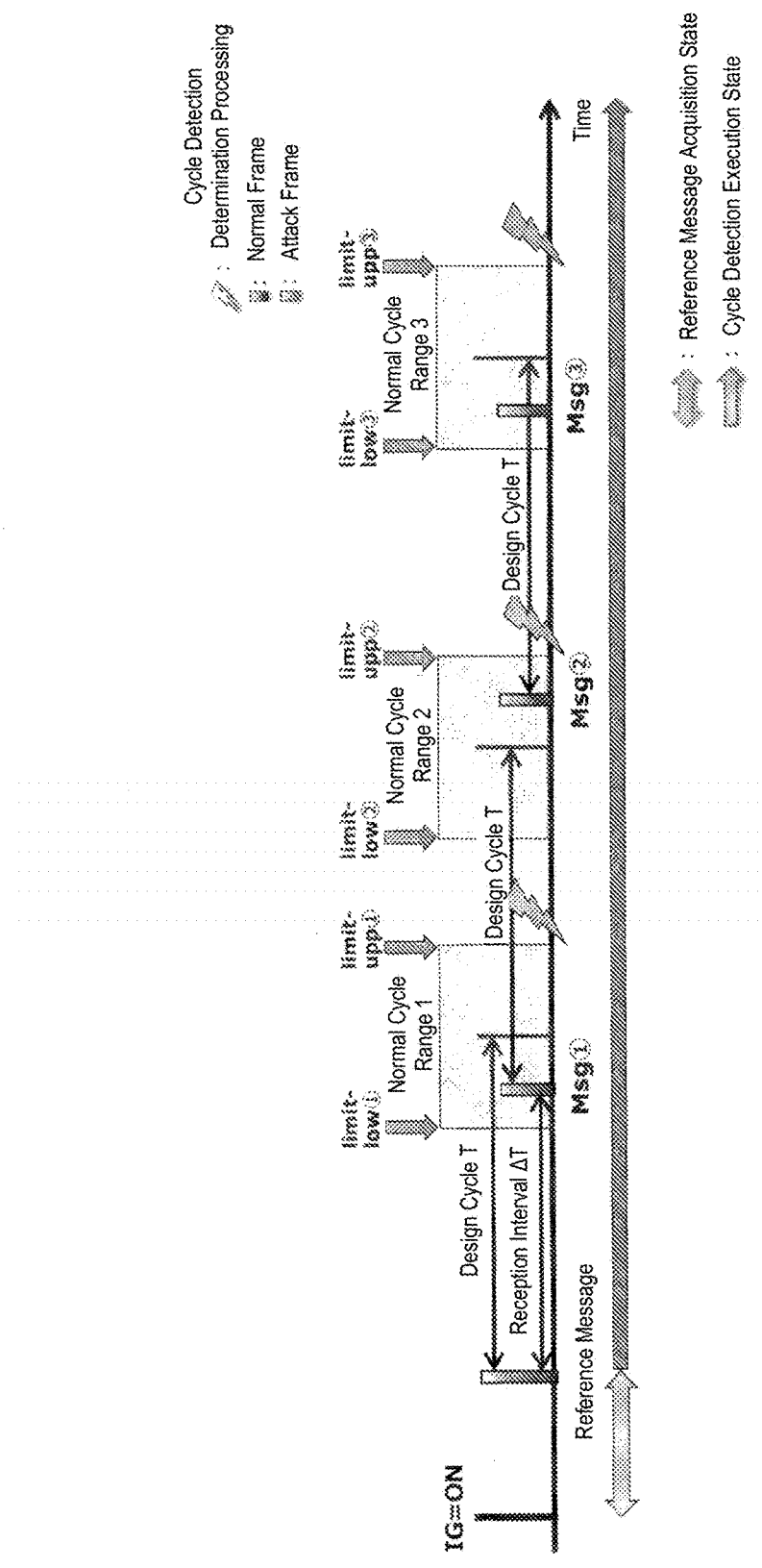
FIG. 4 is an illustrative diagram relating to data determination (normal determination).

FIG. 4 is an illustrative diagram relating to data determination (normal determination). In the illustrative example of the present embodiment, determination processing relating to data (CAN messages, etc.) of a specific data type will be described. In this illustrative example, the horizontal axis indicates time (elapsed time).

The processing unit 20 of the in-vehicle apparatus 2 calculates the reception interval of data of the same type (same message ID) for each piece of data (monitoring target message) defined in the data type table that is stored in the storage unit 21, for example.

In the case where the reception interval is not within the normal cycle range, or where a plurality of data are received within the normal cycle range, the processing unit 20 determines that the data is anomalous. The case where the reception interval is not within the normal cycle range indicates that the anomalous message was specified, and the processing unit 20 determines that the message is specifically anomalous. The case where a plurality of data are received within the normal cycle range indicates that an anomaly was detected in a given range, and the processing unit 20 determines that the plurality of data are range anomalous.

If it is determined that the data (message) is normal, the data (message) is taken as a basis (reference data), and the reception interval between the reference data and the data (message) received next is calculated. Reference data (reference message) is set for each data type (message ID) of the monitoring target messages, and if, in the reference data acquisition state, the reception interval (ΔT) between the message received first and the message received second is within the normal cycle range, the data (message) received second is set as the reference data (reference message). The setting of reference data is not limited to data consecutively received two times, and a configuration may be adopted in which the reference data is determined in the case where data is consecutively received a plurality of times. That is, if the reception interval is within the normal cycle range when data is consecutively received five time, the processing unit 20 may take the data (message) received the fifth time as reference data (reference message), for example.

The vehicle C is started by the IG switch 6 being turned on, and data such as CAN messages are transmitted from the individual in-vehicle ECUs 3 that are connected to the in-vehicle network 4. The processing unit 20 of the in-vehicle apparatus 2 performs first reception of data of each type classified by message ID (CAN-ID) or the like, for example, and the data received first is set as the initial reference data (reference message) for specifying the normal cycle range.

The processing unit 20 specifies (derives) the normal cycle range, by adding the design cycle (T), which is a transmission cycle determined in advance based on the type of data, with reference to the data type table stored in the storage unit 21, to the reception time point indicating the time at which the reference data was received or the like, and adding and subtracting the upper and lower limit values, with the time point obtained by adding the design cycle (T) as the center value. That is, the normal cycle range corresponds to the range (period) between the upper limit time point (limit-upp) obtained by adding the upper limit value to the center value and the lower limit time point (limit-low) obtained by subtracting the lower limit value from the center value. The transmission cycle (design cycle) will thereby be a relative time period from the reception time point (reception time point of the reference data).

The determination processing that is repeatedly performed by the processing unit 20 of the in-vehicle apparatus 2 will be described below. The processing unit 20 calculates a normal cycle range 1, with the design cycle (T) from the reference message as the middle value, and the lower limit time point (limit-low1) and the upper limit time point (limit-upp1) as the lower and upper limits. The processing unit 20 counts the number of messages received after the reference message and the reception interval from the reference message, at the time point of the upper limit time point (limit-upp1).

Since the received message 1 (Msg1) is within the normal cycle range 1 and the number of received messages is 1, the processing unit 20 determines that the message 1 (Msg1) is normal, and updates (resets) the message 1 (Msg1) as the reference message. The processing unit 20 calculates a normal cycle range 2, with the design cycle (T) from the message 1 (Msg1) (reference message at this time point) as the middle value, and the lower limit time point (limit-low2) and the upper limit time point (limit-upp2) as the lower and upper limits.

The processing unit 20 counts the number of messages received after the reference message updated (reset) by the message 1 (Msg1) and the reception interval from the reference message, at the time point of the upper limit time point (limit-upp2). Since the received message 2 (Msg2) is within the normal cycle range 2 and the number of received messages is 1, the processing unit 20 updates (resets) the message 2 (Msg2) as the reference message.

The processing unit 20 of the in-vehicle apparatus 2 updates (resets) the reference data (reference message), based on data (messages) determined to be normal, by repeating the above processing, and repeats the determination processing of data (messages) received after the reference data, using the normal cycle range that is specified each time by the updated reference data.

Figure 5:
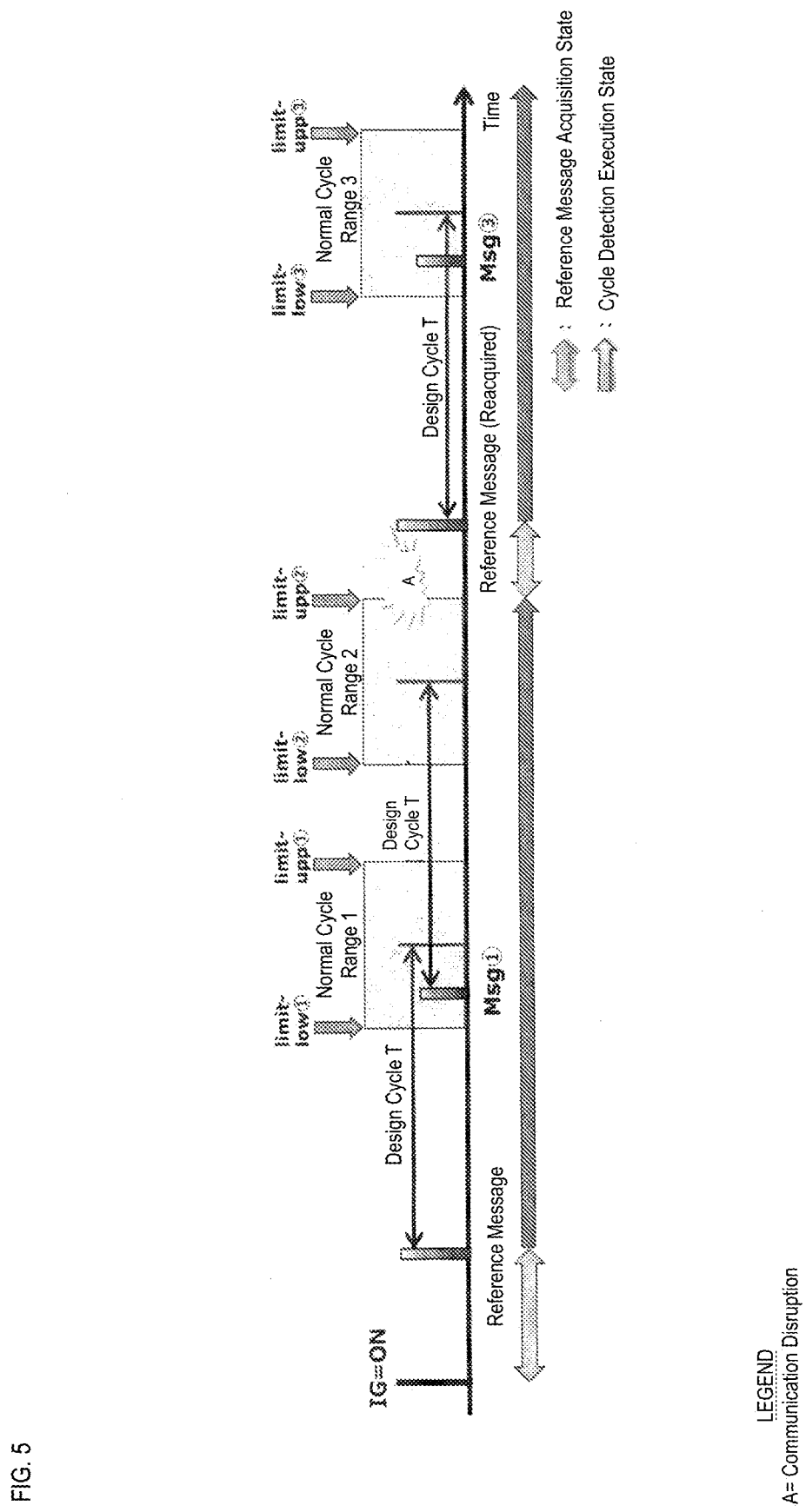
FIG. 5 is an illustrative diagram relating to data determination (occurrence of communication disruption).

FIG. 5 is an illustrative diagram relating to data determination (occurrence of communication disruption). The processing unit 20 calculates the normal cycle range 1, with the design cycle (T) from the reference message as the middle value, and the lower limit time point (limit-low1) and the upper limit time point (limit-upp1) as the lower and upper limits. The processing unit 20 counts the number of messages received after the reference message and the reception interval from the reference message, at the time point of the upper limit time point (limit-upp1).

Since the received message 1 (Msg1) is within the normal cycle range 1 and the number of received messages is 1, the processing unit 20 updates (resets) the message 1 (Msg1) as the reference message. The processing unit 20 calculates the normal cycle range 2, with the design cycle (T) from the message 1 (Msg1) (reference message at this time point) as the middle value, and the lower limit time point (limit-low2) and the upper limit time point (limit-upp2) as the lower and upper limits. The processing unit 20 counts the number of messages received after the reference message updated (reset) by the message 1 (Msg1) and the reception interval from the reference message, at the time point of the upper limit time point (limit-upp2).

Since the number of messages received in the normal cycle range 2 is 0, the processing unit 20 determines that communication disruption has occurred, and reacquires the reference message after the normal cycle range 2 has elapsed, that is, after the upper limit time point (limit-upp2) of the normal cycle range 2 has passed. The processing unit 20 sets the message acquired (received) after the upper limit time point (limit-upp2) of the normal cycle range 2 as the reference message, and specifies a normal cycle range 3.

Figure 6:
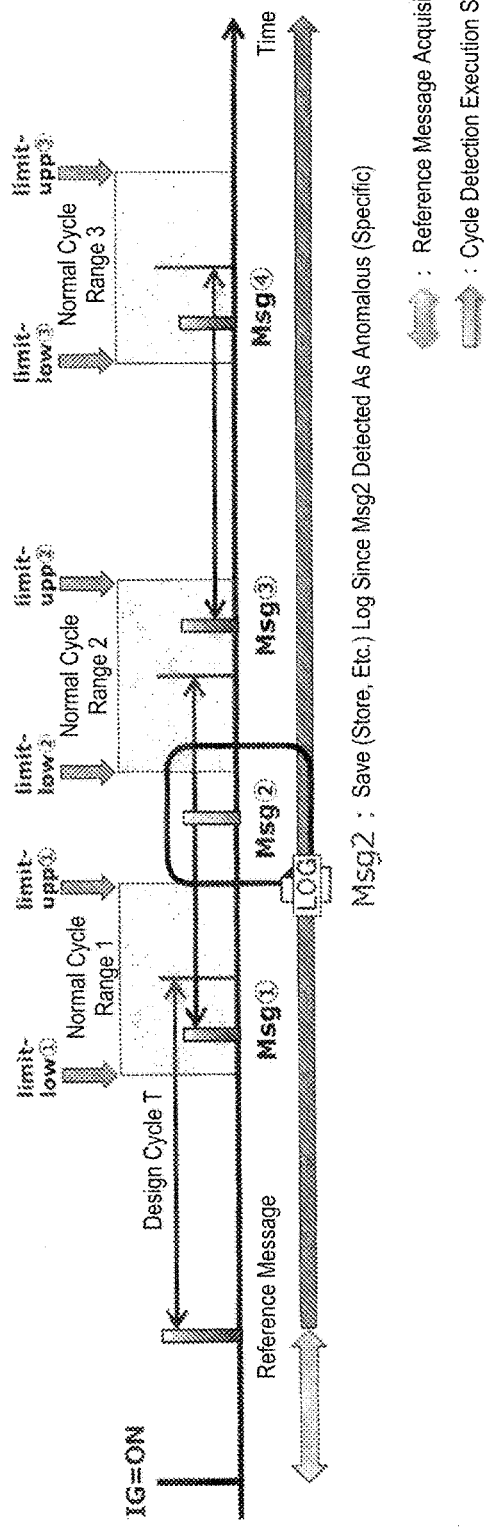
FIG. 6 is an illustrative diagram relating to data determination (anomaly (specific) determination).

FIG. 6 is an illustrative diagram relating to data determination (anomaly (specific) determination). The processing unit 20 calculates the normal cycle range 1, with the design cycle (T) from the reference message as the middle value, and the lower limit time point (limit-low1) and the upper limit time point (limit-upp1) as the lower and upper limits. The processing unit 20 counts the number of messages received after the reference message and the reception interval from the reference message, at the time point of the upper limit time point (limit-upp1).

Since the received message 1 (Msg1) is within the normal cycle range 1 and the number of received messages is 1, the processing unit 20 updates (resets) the message 1 (Msg1) as the reference message. The processing unit 20 calculates the normal cycle range 2, with the design cycle (T) from the message 1 (Msg1) (reference message at this time point) as the middle value, and the lower limit time point (limit-low2) and the upper limit time point (limit-upp2) as the lower and upper limits.

The processing unit 20 counts the number of messages received after the reference message updated (reset) by the message 1 (Msg1) and the reception interval from the reference message, at the time point of the upper limit time point (limit-upp2). Since one message (message 2 (Msg2)) is received outside the normal cycle range and one message (message 3 (Msg3)) is received within the normal cycle range 2, the processing unit 20 detects that the message 2 (Msg2) is anomalous (determined to be specifically anomalous), and updates (resets) the message 3 (Msg3) as the reference message.

Even if data that is determined to be specifically anomalous is received, the processing unit 20 updates (resets) the reference data (reference message), based on data (messages) determined to be normal, by repeating the above processing. The processing unit 20 repeats the determination processing of data (messages) received after the reference data, using the normal cycle range that is specified each time by the updated reference data.

Figure 7:
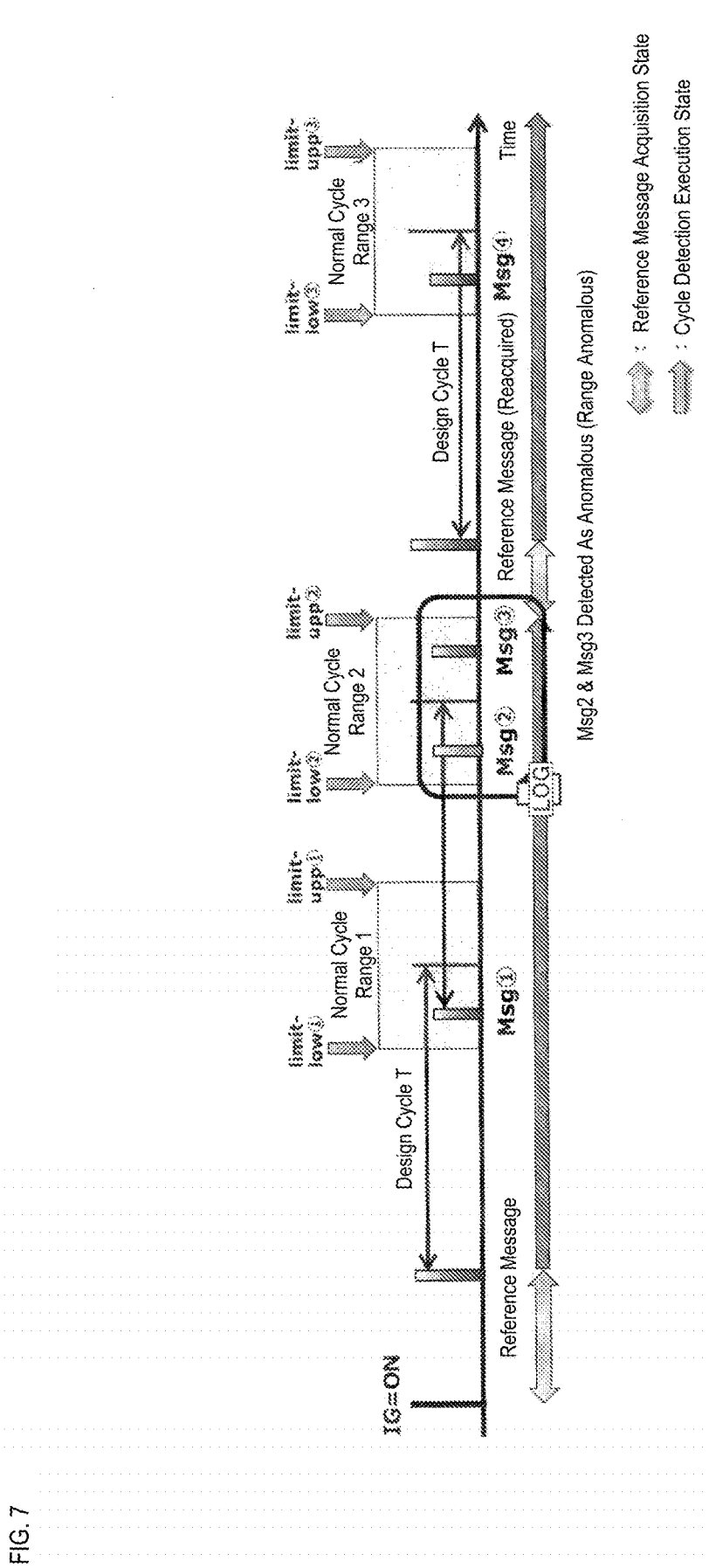
FIG. 7 is an illustrative diagram relating to data determination (anomaly (range) determination).

FIG. 7 is an illustrative diagram relating to data determination (anomaly (range) determination). The processing unit 20 calculates the normal cycle range 1, with the design cycle (T) from the reference message as the middle value, and the lower limit time point (limit-low1) and the upper limit time point (limit-upp1) as the lower and upper limits. The processing unit 20 counts the number of messages received after the reference message and the reception interval from the reference message, at the time point of the upper limit time point (limit-upp1).

Since the received message 1 (Msg1) is within the normal cycle range 1 and the number of received messages is 1, the processing unit 20 updates (resets) the message 1 (Msg1) as the reference message. The processing unit 20 calculates the normal cycle range 2, with the design cycle (T) from the message 1 (Msg1) (reference message at this time point) as the middle value, and the lower limit time point (limit-low2) and the upper limit time point (limit-upp2) as the lower and upper limits.

The processing unit 20 counts the number of messages received after the reference message updated (reset) by the message 1 (Msg1) and the reception interval from the reference message, at the time point of the upper limit time point (limit-upp2). Since two or more messages (message 2 (Msg2) and message 3 (Msg3)) are received within the normal cycle range 2, the processing unit 20 detects that the message 2 (Msg2) and the message 3 (Msg3) are anomalous (determined to be range anomalous), and reacquires the reference message after the normal cycle range 2 has elapsed, that is, after the upper limit time point (limit-upp2) of the normal cycle range 2 has passed.

The processing unit 20 sets the message acquired (received) after the upper limit time point (limit-upp2) of the normal cycle range 2 as the reference message, and specifies the normal cycle range 3. Even if a plurality of data that is determined to be range anomalous is received, the processing unit 20 updates (resets) the reference data (reference message) by repeating the above processing, and repeats the determination processing of data (messages) received after the reference data, using the normal cycle range that is specified each time by the updated reference data.

Figure 8:
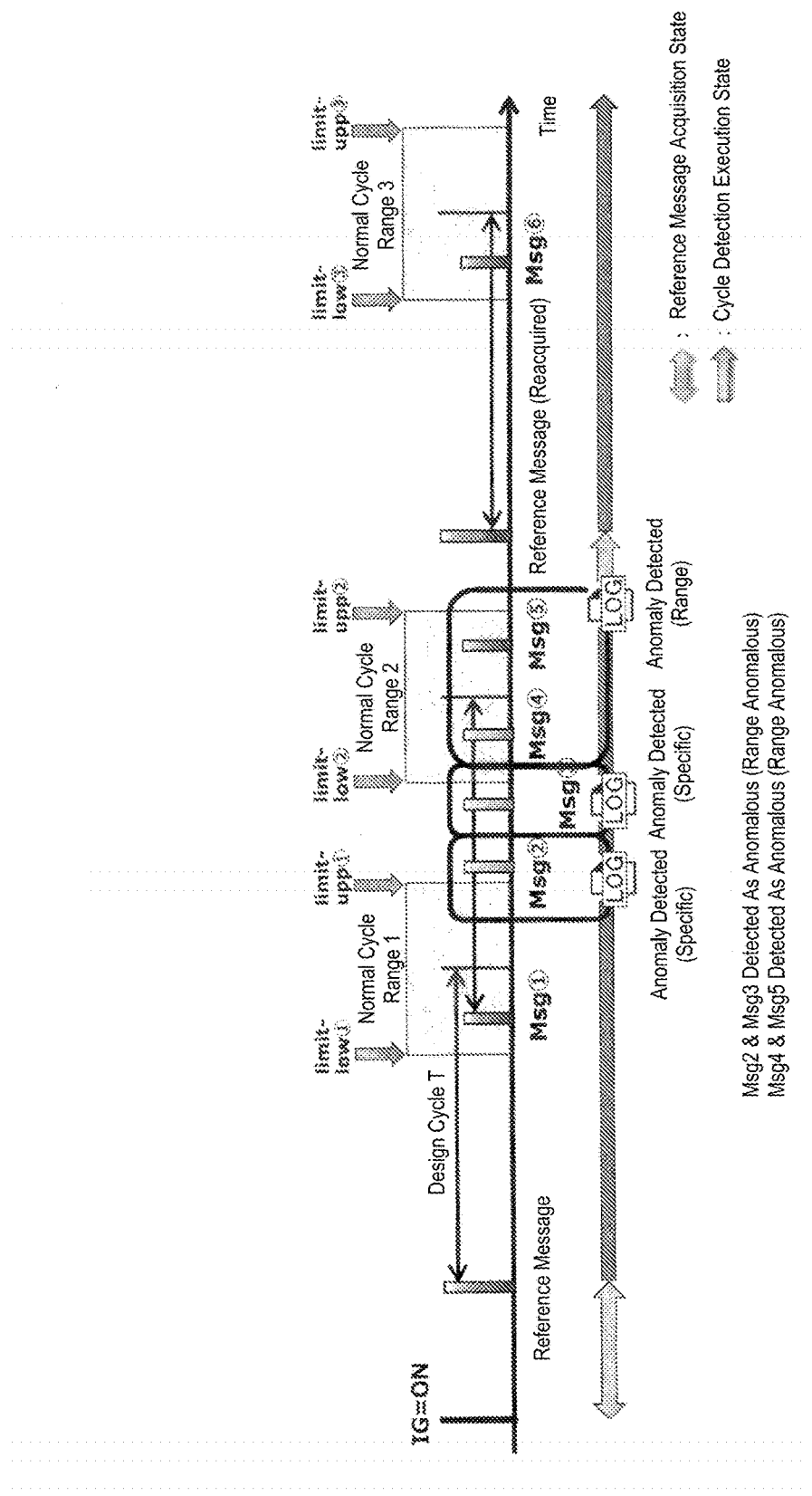
FIG. 8 is an illustrative diagram relating to data determination (combination).

FIG. 8 is an illustrative diagram relating to data determination (combination). The processing unit 20 calculates the normal cycle range 1, with the design cycle (T) from the reference message as the middle value, and the lower limit time point (limit-low1) and the upper limit time point (limit-upp1) as the lower and upper limits. The processing unit 20 counts the number of messages received after the reference message and the reception interval from the reference message, at the time point of the upper limit time point (limit-upp1).

Since the received message 1 (Msg1) is within the normal cycle range 1 and the number of received messages is 1, the processing unit 20 updates (resets) the message 1 (Msg1) as the reference message. The processing unit 20 calculates the normal cycle range 2, with the design cycle (T) from the message 1 (Msg1) (reference message at this time point) as the middle value, and the lower limit time point (limit-low2) and the upper limit time point (limit-upp2) as the lower and upper limits.

The processing unit 20 counts the number of messages received after the reference message updated (reset) by the message 1 (Msg1) and the reception interval from the reference message, at the time point of the upper limit time point (limit-upp2). Since two messages (message 2 (Msg2), message 3 (Msg3)) are received outside the normal cycle range and two or more messages (message 4 (Msg4), message 5 (Msg5)) are received within the normal cycle range, the processing unit 20 detects that the message 2 (Msg2) and the message 3 (Msg3) are anomalous (determined to be specifically anomalous). The processing unit 20 detects that the message 4 (Msg4) and the message 5 (Msg5) are anomalous (determined to be range anomalous), and reacquires the reference message after the normal cycle range 2 has elapsed.

Even if a plurality of data determined to be specifically anomalous or range anomalous are received, the processing unit 20 updates (resets) the reference data (reference message), by repeating the above processing, and repeats the determination processing of data (messages) received after the reference data, using the normal cycle range that is specified each time by the updated reference data.

Figure 9:
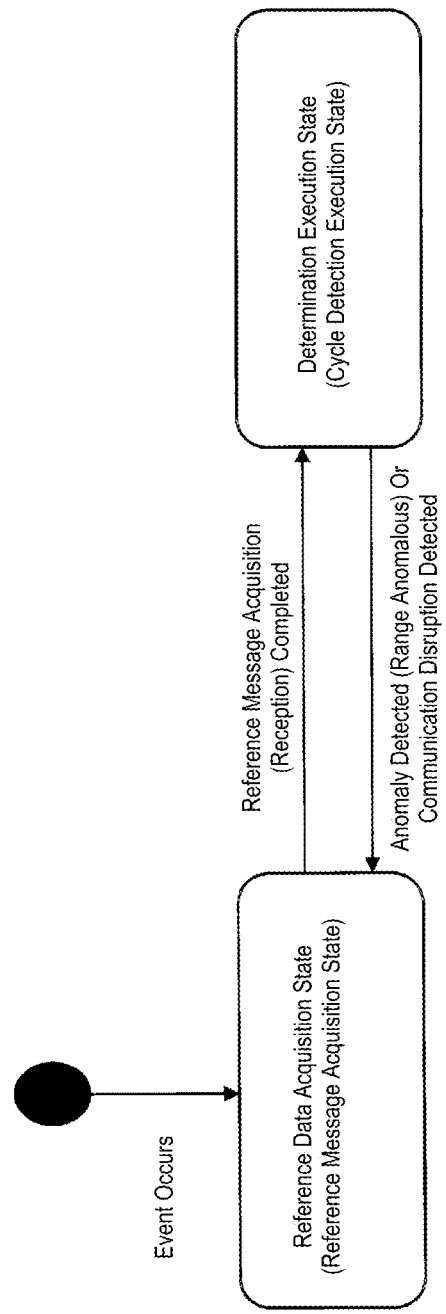
FIG. 9 is an illustrative diagram relating to the state transition of a processing unit of the in-vehicle apparatus.

FIG. 9 is an illustrative diagram relating to the state transition of the processing unit 20 of the in-vehicle apparatus 2. The processing unit 20 of the in-vehicle apparatus 2 transitions between a plurality of states in the process of performing the determination processing. The plurality of states include, for example, a reference data reception state (reference message acquisition state) for receiving data to serve as a basis when specifying the normal cycle range, and a determination execution state (cycle detection execution state) for determining the validity of received data based on the specified normal cycle range.

For example, directly after the IG switch 6 is turned on, the processing unit 20 of the in-vehicle apparatus 2 enters the reference data reception state, and thereafter transitions to the determination execution state when data is initially received (first received). If it is determined that data acquired within the normal cycle range is normal, the processing unit 20 maintains the determination execution state, by updating (resetting) the normal data as reference data. Entering the reference data reception state is not limited to the IG switch 6 being turned on, and the processing unit 20 may also transition when the battery is turned on or at wake-up from a communication sleep state. That is, the trigger for the processing unit 20 of the in-vehicle apparatus 2 transitioning to the reference data reception state may be based on various power supply triggers (transition of power supply state), such as the IG switch 6 turning on, the battery turning on, ACC turning on (accessory power supply turning on), and transition at wake-up from the communication sleep state. That is, when such an event relating to a power supply trigger (transition of power supply state) occurs, the processing unit 20 of the in-vehicle apparatus 2 may be configured to transition to the reference data reception state, by detecting the event or the like.

The processing unit 20, when in the determination execution state, transitions to the reference data reception state, if an anomaly is detected (range anomaly) due to acquiring a plurality of data of the same type within the normal cycle range, or if data of the same type cannot be acquired within the normal cycle range (communication disruption detected). The processing unit 20, having transitioned from the determination execution state to the reference data reception state, transitions to the determination execution state, with data of the same type initially acquired after the normal cycle range has elapsed, that is, after the upper limit time point (limit-upp) of the normal cycle range has passed, as the reference data.

FIG. 10 is an illustrative diagram relating to determination modes of the processing unit of the in-vehicle apparatus 2. When performing the determination processing of the present embodiment, the processing unit 20 of the in-vehicle apparatus 2 may be configured to set a unit determination period, targeting the period from the upper limit time point (limit-upp[t]) of the previous normal cycle range to the upper limit time point (limit-upp [t+1]) of the current normal cycle range, and perform determination processing every unit determination period. The unit determination period set in this way includes a period (period A) from the upper point (limit-upp[t]) of the previous normal cycle range to the lower limit time point (limit-low[t+1]) of the current normal cycle range and a period (period B) from the lower point (limit-low[t+1]) of the current normal cycle range to the upper point (limit-upp[t+1]) of the current normal cycle range.

The processing unit 20 counts the number of received (acquired) data (data of the same type as the reference data) in each of these periods A and B, and performs determination processing and updating (resetting) of the reference data, according to the number of data in each of the periods (period A and period B).

If the number of data acquired in period A is 0 and the number of data acquired in period B is 0, the processing unit 20 determines that communication interruption (loss of normal data, etc.) has occurred in period B, and transitions to the reference data reception state in order to set data acquired after the upper limit time point of the current normal cycle range has passed as the reference data.

If the number of data acquired in period A is 0 and the number of data acquired in period B is 1, the processing unit 20 determines that the data received in period B is normal, sets the data acquired in period B as the reference data, and maintains the determination execution state.

If the number of data acquired in period A is 0 and the number of data acquired in period B is 2 or more, the processing unit 20 determines that the plurality of data received in period B are anomalous (range anomalous), and transitions to the reference data reception state in order to set data acquired after the upper limit time point of the current normal cycle range has passed as the reference data.

If the number of data acquired in period A is 1 or more and the number of data acquired in period B is 0, the processing unit 20 determines that the data received in period A is anomalous (specifically anomalous). The processing unit 20 determines that communication interruption (loss of normal data, etc.) has occurred in period B, and transitions to the reference data reception state in order to set data acquired after the upper limit time point of the current normal cycle range has passed as the reference data.

If the number of data acquired in period A is 1 or more and the number of data acquired in period B is 1, the processing unit 20 determines that the data received in period A is anomalous (specifically anomalous) and that the data received in period B is normal, sets the data acquired in period B as the reference data, and maintains the determination execution state.

If the number of data acquired in period A is 1 or more and the number of data acquired in period B is 2 or more, the processing unit 20 determines that the data received in period A is anomalous (specifically anomalous) and that the plurality of data received in period B is anomalous (range anomalous), and transitions to the reference data reception state in order to set data acquired after the upper limit time point of the current normal cycle range has passed as the reference data.

The information illustrated in the present embodiment may be stored in the storage unit 21 in table format as a determination mode table, for example. The processing unit 20 may perform determination processing and updating (resetting) of reference data, with reference to the determination mode table, based on the number of data counted for each unit determination period. The processing unit sets different determination codes, for each processing mode that is determined by the number of data (data of same type as the reference data) thus received (acquired) in each of the periods A and B, and, for each unit determination period (upper limit time point of the normal cycle range), stores time information of this upper limit time point and the determination code in association with each other in the storage unit 21.

Figure 11:
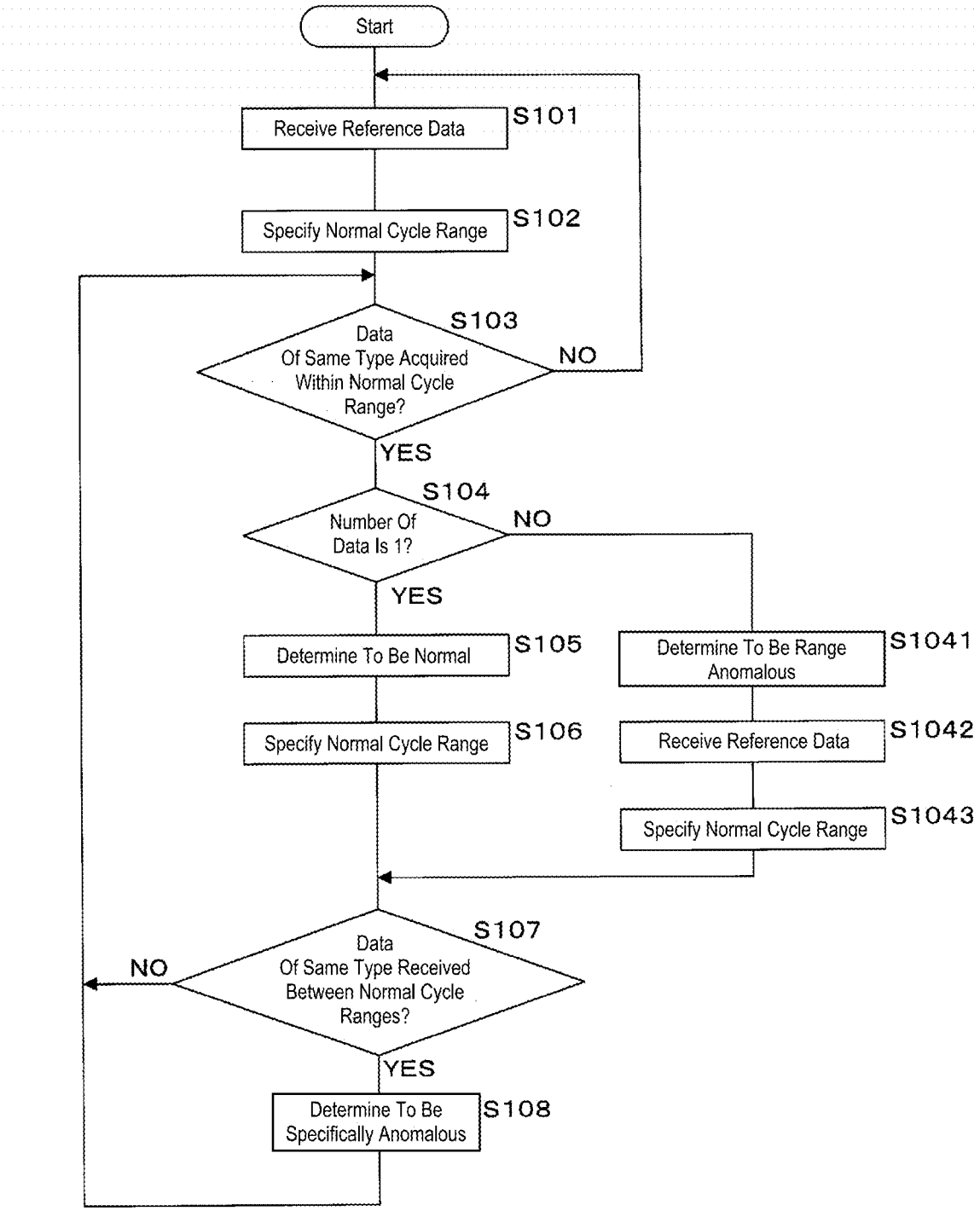
FIG. 11 is a flowchart illustrating processing by the processing unit of the in-vehicle apparatus

FIG. 11 is a flowchart illustrating processing by the processing unit of the in-vehicle apparatus 2. The processing unit 20 of the in-vehicle apparatus 2 routinely performs the following processing when the vehicle C has been started (when the IG switch 6 is on), for example.

The processing unit 20 of the in-vehicle apparatus 2 receives reference data (S101). The processing unit 20 transitions to the determination execution state, due to receiving the reference data. The vehicle C is started by the IG switch 6 being turned on, and data such as CAN messages are transmitted from the individual in-vehicle ECUs 3 that are connected to the in-vehicle network 4 by being broadcast, for example. By receiving (acquiring) the transmitted data, the processing unit 20 of the in-vehicle apparatus 2 receives data or each type that is classified by message ID (CAN-ID) or the like, for example, for the first time. The data received for the first time is set as reference data for specifying the normal cycle range. When setting the received data as reference data, the processing unit 20 of the in-vehicle apparatus 2 may be configured to store the type (message ID) of the data and the reception time point indicating the time at which the data was received or the like in association with each other in the storage unit 21. The processing unit 20 of the in-vehicle apparatus 2 thereafter performs the following processing for each type of data (e.g., for each message ID).

The processing unit 20 of the in-vehicle apparatus 2 specifies the normal cycle range (S102). The processing unit 20 specifies the normal cycle range, based on the type (message ID) of data, with reference to the data type table that is stored in the storage unit 21, for example. When specifying the normal cycle range, the processing unit 20 may compute and specify the normal cycle range, based on the design cycle and the upper-lower limit value ratio. For example, the processing unit 20 adds the design cycle (T), which is a transmission cycle that is determined in advance based on the type of data, to the reception time point (C) of the reference data, and determines the center value (C+T) of the normal cycle range. The upper-lower limit value (L) that is determined based on the upper-lower limit value ratio is, for example, added to (C+T+L) and subtracted from (C+T−L) the center value (C+T). A range ((C+T−L) to (C+T+L)) of ±L with respect to the center value (C+T) is thereby confirmed, with this range corresponding to the normal cycle range. The time point specified by adding (C+T+L) the upper-lower limit value (L) to the center value (C+T) corresponds to the upper limit time point (limit-upp) of the normal cycle range. The time point specified by subtracting (C+T−L) the upper-lower limit value (L) from the center value (C+T) corresponds to the lower limit time point (limit-low) of the normal cycle range.

By specifying the normal cycle range in this way, time point information for determining the validity of data (data of the same type as the reference data) received after receipt of the reference data can be confirmed. In the present embodiment, the upper-lower limit value (L) to be added to the center value (C+T) and the upper-lower limit value (L) to be subtracted from the center value (C+T) are equal values, but are not limited thereto, and an upper limit value (Lu) to be added and a lower limit value (Ll) to be subtracted may be set to different values.

The processing unit 20 of the in-vehicle apparatus 2 determines whether data of the same type was acquired within the normal cycle range (S103). Data of the same type is data of the same type as the received reference data, and in the case where the data is a CAN message, for example, messages (data) whose message IDs (CAN-IDs) are the same are data of the same type. The processing unit 20 calculates a reception interval (ΔT) from the reception time point of the reference data to the reception time point of data of the same type received next. The processing unit 20 may be configured to determine whether data of the same type was acquired within the normal cycle range, depending on whether the reception interval (ΔT) is within the normal cycle range, that is, whether the reception interval (ΔT) is greater than or equal to the elapsed time from the reception time point of the reference data to the lower limit time point (limit-low) of the normal cycle range, and within the elapsed time period from the reception time point of the reference data to the upper limit time point (limit-upp) of the normal cycle range.

If the reception interval (ΔT) from the reception time point of the reference data to the reception time point of data of the same type received next is greater than or equal to the elapsed time from the reception time point of the reference data to the lower limit time point (limit-low) of the normal cycle range, and within the elapsed time from the reception time point of the reference data to the upper limit time point (limit-upp) of the normal cycle range, the processing unit 20 determines that data of the same type was acquired within the normal cycle range. If data of the same type is not acquired before the upper limit time point (limit-upp) of the normal cycle range is passed, the processing unit 20 determines that data of the same type was not acquired within the normal cycle range. Alternatively, the processing unit 20 may determine whether data of the same type was acquired within the normal cycle range, based on whether data of the same type was received (acquired) during the period from the lower limit time point (limit-low) to the upper limit time point (limit-upp) of the normal cycle range. That is, if data of the same type was received during the period from the lower limit time point (limit-low) to the upper limit time point (limit-upp) of the normal cycle range (lower limit time point≤reception time point of data of same type≤upper limit time point), the processing unit 20 determines that data of the same type was acquired within the normal cycle range.

If data of the same type is not acquired (S103: NO), the processing unit 20 of the in-vehicle apparatus 2 performs loop processing in order to execute S101 again. If data of the same type is not acquired within the normal cycle range, it is determined that communication disruption due to loss of the data or the like has occurred, and the processing unit 20 of the in-vehicle apparatus 2 attempts to receive data of the same type by executing S101 again. The processing unit 20 transitions to the reference data reception state. If the loop processing from S103 to S101 is performed continuously, and the number of times that the loop processing is performed continuously reaches a predetermined threshold number of times, such as 10 times, for example, or if a threshold number of times is exceeded, the processing unit 20 may determine that the data received in S101 is anomalous.

If data of the same type is acquired (S103: YES), the processing unit 20 of the in-vehicle apparatus 2 determines whether the number of received data is 1 (S104). The processing unit 20 of the in-vehicle apparatus 2 counts the number of data of the same type received within the normal cycle range, that is, during the period from the lower limit time point (limit-low) to the upper limit time point (limit-upp) of the normal cycle range, and determines whether the number of received data is 1 or not (a plurality, i.e., 2 or more).

The processing unit 20 of the in-vehicle apparatus 2 stores, for all the received (acquired) data, the reception time point and data type such as the CAN-ID of each of the data in association with each other in the storage unit 21. The processing unit 20 of the in-vehicle apparatus 2 may also be configured to store the reception interval, which is the difference between the reception time point of each of the data and the reception time point of the reference data, in the storage unit 21 in association with the data type such as the CAN-ID.

If the number of received data is 1 (S104: YES), the processing unit 20 of the in-vehicle apparatus 2 determines that the received data is normal (S105). If the number of received data acquired within the normal cycle range is 1, the data is data normally transmitted by one of the in-vehicle ECUs 3, based on the design cycle, and the processing unit 20 of the in-vehicle apparatus 2 determines that the received data is normal.

The processing unit 20 of the in-vehicle apparatus 2 sets the received data as reference data to be used in the next determination processing, and specifies the normal cycle range (S106). The processing unit 20 of the in-vehicle apparatus 2 sets the received data, that is, the data determined to be normal in the processing of S105, as reference data to be used in the determination processing of data of the same type that is received next. In this way, the processing unit 20 of the in-vehicle apparatus 2 is able to continuously set (cyclically reset) reference data that corresponds to the load situation of the in-vehicle network 4 or the like in real time, by repeatedly setting reference data using data determined to be normal in the directly preceding processing. The processing unit 20 of the in-vehicle apparatus 2 specifies the normal cycle range similarly to the processing of S102, based on reference data reset in this way. The processing unit 20 repeats the validity determination of the data that is received thereafter, based on this specified normal cycle range.

If the number of received data is not 1 (S104: NO), that is, if the number of received data of the same type is 2 or more (a plurality), the processing unit 20 determines that the received plurality of data is range anomalous (S1041). Out of a plurality of data (data of the same type) received within a single normal cycle range, at least one or more of the data are anomalous data. In this case, the processing unit 20 of the in-vehicle apparatus 2 determines that the received plurality of data is range anomalous, given that the anomalous data is included in a predetermined range (normal cycle range). The processing unit 20 of the in-vehicle apparatus 2 may also be configured to store the data type and reception time point of the received plurality of data determined to be range anomalous in the storage unit 21 as attack detection log data, and output the data type and reception time point to the external server 100 or the display device 5.

The processing unit 20 of the in-vehicle apparatus 2 receives reference data (S1042). The processing unit 20 of the in-vehicle apparatus 2 receives data of the same type received after the normal cycle range as the reference data. Since at least one or more of the received plurality of data determined to be range anomalous are anomalous data, the processing unit 20 of the in-vehicle apparatus 2 does not set the data determined to be range anomalous as reference data. Validity determination of data acquired thereafter being performed using data determined to be range anomalous can thereby be reliably avoided. The processing unit 20 of the in-vehicle apparatus 2 receives, as the reference data, data of the same type received after the normal cycle range in which the plurality of data determined to be range anomalous was received.

The processing unit 20 of the in-vehicle apparatus 2 specifies the normal cycle range (S1043). The processing unit 20 of the in-vehicle apparatus 2 sets the data received in S1042 as reference data to be used in the next determination processing, and specifies the normal cycle range similarly to the processing of S102. Even if a plurality of data determined to be range anomalous are thus received, the determination processing can be continued or resumed by resetting the reference data, based on data received thereafter.

The processing unit 20 of the in-vehicle apparatus 2 may be configured to perform processing for specifying or extracting which data that is anomalous, out of a plurality of data determined to be range anomalous. When performing the specification processing, the processing unit 20 of the in-vehicle apparatus 2 may use a method that takes data that is closest to the middle value of the normal cycle range, out of data received in the normal cycle range, to be normal data, and the remaining data to be anomalous data, for example. In this case, processing for specifying which data is anomalous is performed, assuming there is always one normal piece of data among the plurality of data. Alternatively, the processing unit of the in-vehicle apparatus 2 may use a method that involves acquiring the reception time distribution of normal data within the normal cycle range in advance and determining the data closest to the middle value of the distribution to be normal data. In this case, the method utilizes the fact that while the reception time distribution often takes a normal distribution in the normal cycle range, the middle of the distribution is not necessarily near the middle value of the normal cycle range. This method assumes that the reception time distribution also changes when the number or type of the in-vehicle apparatus 2 connected on the same communication line 41 (CAN bus) changes, depending on options and the like that are installed in the vehicle C. Alternatively, the processing unit 20 of the in-vehicle apparatus 2 may use a method for determining which data is anomalous by the relationship with the CAN-IDs or the like of other data transmitted in proximity thereto on the same communication line 41 (CAN bus). This method utilizes the fact that CAN-IDs are received in a certain order by an in-vehicle relay device such as a CAN gateway, and the regularity of this order is more pronounced as the design cycle of the data (CAN message) becomes longer. Alternatively, the processing unit 20 of the in-vehicle apparatus 2 may use a method for determining which data is anomalous also using information included in the received data other than the cycle, such as the contents of the data. In this case, determination may be integrally performed in combination with other detection algorithms. Alternatively, the processing unit 20 of the in-vehicle apparatus 2 may use a method for determining which data is anomalous by the electrical waveform characteristics. In this case, the method utilizes the fact that the electrical waveform differs at the physical layer level even with the same data, depending on the connection location of the transmission node of the in-vehicle apparatus 2 or the like and the differences between CAN transceivers, for example. Furthermore, this method utilizes the fact that the electrical waveform characteristics and the like also differ, depending on whether the transmission node is connected to a trunk line or a branch line of the harness constituting the communication lines 41. The processing unit 20 of the in-vehicle apparatus 2 may use all the above-described methods in specifying which data is anomalous, out of the plurality of data determined to be range anomalous, and may ultimately determine (by majority decision) that data specified to be anomalous by the most methods is anomalous data, based on the specification results by the different methods.

After executing S106 or S1043, the processing unit 20 of the in-vehicle apparatus 2 determines whether data of the same type has been received between the previous normal cycle range and the current normal cycle range (S107). The normal cycle range is specified every time the reference data is set, and the specified normal cycle ranges are adjacent to each other in time series. Since normal data is not transmitted in the period between two normal cycle ranges (T[t], T[t+1]) that are adjacent in time series, data received (acquired) in that period is anomalous data. After executing the processing of S106 or S1043, the processing unit 20 of the in-vehicle apparatus 2 determines whether data of the same type was received between the previous normal cycle range (T[t]) and the current normal cycle range (T[t+1]), that is, between the upper limit time point (limit-upp[t]) of the previous normal cycle range and the lower limit time point (limit-low [t+1]) of the current normal cycle range.

If data of the same type was received (S107: YES), the processing unit 20 of the in-vehicle apparatus 2 determines that the received data is specifically anomalous (S108). If the number of received data is 1, the processing unit 20 of the in-vehicle apparatus 2 determines that the data is specifically anomalous, since the data can be individually specified as anomalous. Also, even if the number of received data is 2 or more (a plurality), the processing unit 20 of the in-vehicle apparatus 2 determines that each of these pieces of data is specifically anomalous. The processing unit 20 of the in-vehicle apparatus 2 may also be configured to store the data type and reception time point of the single data or plurality of data determined to be specifically anomalous in the storage unit 21 as attack detection log data, and output the single data or plurality of data to the external server 100 or the display device 5.

If data of the same type was not received (S107: NO), or after executing S108, the processing unit 20 of the in-vehicle apparatus 2 performs loop processing in order to execute S103 again. Needless to say, the normal cycle range that is used when executing S103 in the loop processing is the normal cycle range specified in the processing of S106 or S1043. The processing unit 20 of the in-vehicle apparatus 2 may also be configured to store all the results (determination results) of the determination processing of the present embodiment in the storage unit 21, or transmit (output) the results to the external server 100 via the external communication device 1.

When counting the number of received data in the determination processing of the present embodiment, the processing unit 20 of the in-vehicle apparatus 2 may be configured to, for example, set a unit determination period, targeting the period from the upper limit time point (limit-upp [t]) of the previous normal cycle range to the upper limit time point (limit-upp [t+1]) of the current normal cycle range, and perform determination processing every unit determination period. In this case, the processing unit 20 of the in-vehicle apparatus 2 may be configured to perform the determination processing at the upper limit time point of each normal cycle range. In the present embodiment, the unit determination period in which the processing unit 20 of the in-vehicle apparatus 2 performs determination processing is from the upper limit time point (limit-upp [t]) of the previous normal cycle range to the upper limit time point (limit-upp [t+1]) of the current normal cycle range, but is not limited thereto, and from the lower limit time point (limit-low [t]) of the previous normal cycle range to the lower limit time point (limit-low [t+1]) of the current normal cycle range may be taken as the unit determination period.

The processing unit 20 of the in-vehicle apparatus 2, when executing the flowchart of the present embodiment, may be configured to perform processing according to individual flowcharts for each type of data. That is, when the number of types (CAN-IDs) of data to undergo determination execution is 10, for example, the same number (10) of subprocesses may be generated, and processing may be performed in each of the subprocesses in parallel with the processing according to the flowchart.

In the present embodiment, the processing unit 20 of the in-vehicle apparatus 2 performs all of the processing, but is not limited thereto, and part of the processing may, for example, be performed by the processing unit 20 of the in-vehicle apparatus 2 and one of the external server 100 and the in-vehicle ECUs 3 cooperating with each other through interprocess communication or the like.

Embodiment 2

Figure 12:
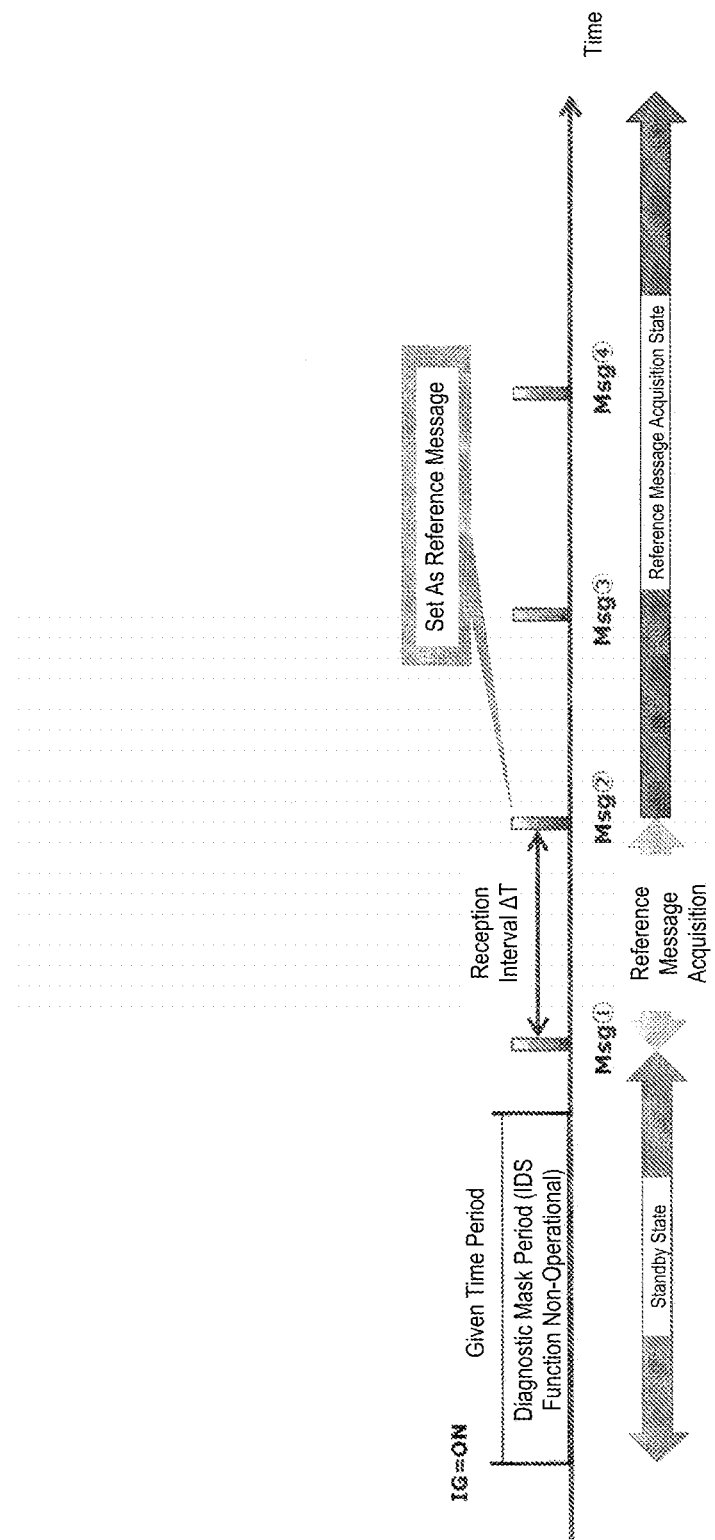
FIG. 12 is an illustrative diagram relating to data determination (diagnostic mask period) according to Embodiment 2.

FIG. 12 is an illustrative diagram relating to data determination (diagnostic mask period) according to Embodiment 2. In the illustrative example of the present embodiment, determination processing relating to data (CAN message, etc.) of a specific data type will be described. In this illustrative example, the horizontal axis shows time (elapsed time).

When the IG switch 6 is turned on, the processing unit 20 of the in-vehicle apparatus 2 performs standby processing without receiving data to undergo anomaly detection, until the diagnostic mask period elapses. When performing the standby processing, the processing unit 20 of the in-vehicle apparatus 2 may be configured to continuously perform processing for determining whether the diagnostic mask period has elapsed. The diagnostic mask period is stored in the storage unit 21 as a few seconds, for example, and the processing unit 20 of the in-vehicle apparatus 2 is able to acquire the value of the diagnostic mask period, by referring to the storage unit 21. The diagnostic mask period is, for example, set as a period for performing diagnostic processing (self-diagnostic processing) on the in-vehicle ECUs 3 and the in-vehicle apparatus 2, and is a period in which anomaly detection on the in-vehicle apparatus 2 or the like installed in the vehicle C is not performed.

The processing unit 20 of the in-vehicle apparatus 2 starts acquiring data to undergo anomaly detection, after the diagnostic mask period elapses. The processing unit 20 of the in-vehicle apparatus 2 maintains the standby state from the start time point of the diagnostic mask period triggered by the IG switch 6 being turned on until the reception time point of data (in the present embodiment, message 1: Msg1) initially received after completion of the diagnostic mask period (after the end time point). Similarly to Embodiment 1, the processing unit 20 of the in-vehicle apparatus 2 calculates the reception interval of data of the same type (same message ID) that is consecutively received, for each piece of data (monitoring target message) defined in the data type table that is stored in the storage unit 21, for example.

As illustrated in the present embodiment, the processing unit 20 of the in-vehicle apparatus 2 receives data of the same type (message 2: Msg2), with the data (message 1: Msg1) initially received after the diagnostic mask period has elapsed as the basis. In this case, since data of the same type is not received between the data (message 1: Msg1) and the data (message 2: Msg2), these pieces of data (message 1: Msg1, message 2: Msg2) corresponds to two pieces of data of the same type received consecutively. Note that even if other types of data are received between the time point when the two pieces of data (message 1: Msg1, message 2: Msg2) of the same type are received, needless to say, these two pieces of data (message 1: Msg1, message 2: Msg2) of the same type corresponds to two pieces of data of the same type received consecutively.

Similarly to Embodiment 1, the processing unit 20 of the in-vehicle apparatus 2 calculates the reception interval between the data (message 1: Msg1) initially received and the data (message 2: Msg2) received later, and, if this reception interval is within the normal cycle range specified on the basis of the reception time point of the data (message 1: Msg1) initially received, determines that these pieces of data (message 1: Msg1, Message 2: Msg2) are normal. The processing unit 20 of the in-vehicle apparatus 2 sets the data (message 2: Msg2) received later, out of the two pieces of data of the same type thus received consecutively, as reference data (reference message).

The processing unit 20 of the in-vehicle apparatus 2 maintains the reference data reception state (reference message acquisition state) from the reception time point of the data (message 1: Msg1) initially received until the data (message 2: Msg2) received later is set as reference data (reference message). That is, the processing unit 20 of the in-vehicle apparatus 2 maintains the reference data reception state (reference message acquisition state) from the reception time point of the data (message 1: Msg1) initially received to the reception time point of the data (message 2: Msg2) received later, after completion of the diagnostic mask period. The processing unit 20 of the in-vehicle apparatus 2 starts anomaly detection on the received data similarly to Embodiment 1, using the reference data (reference message) thus set. When the anomaly detection is started, the processing unit 20 of the in-vehicle apparatus 2 transitions to the determination execution state (cycle detection execution state).

Figure 13:
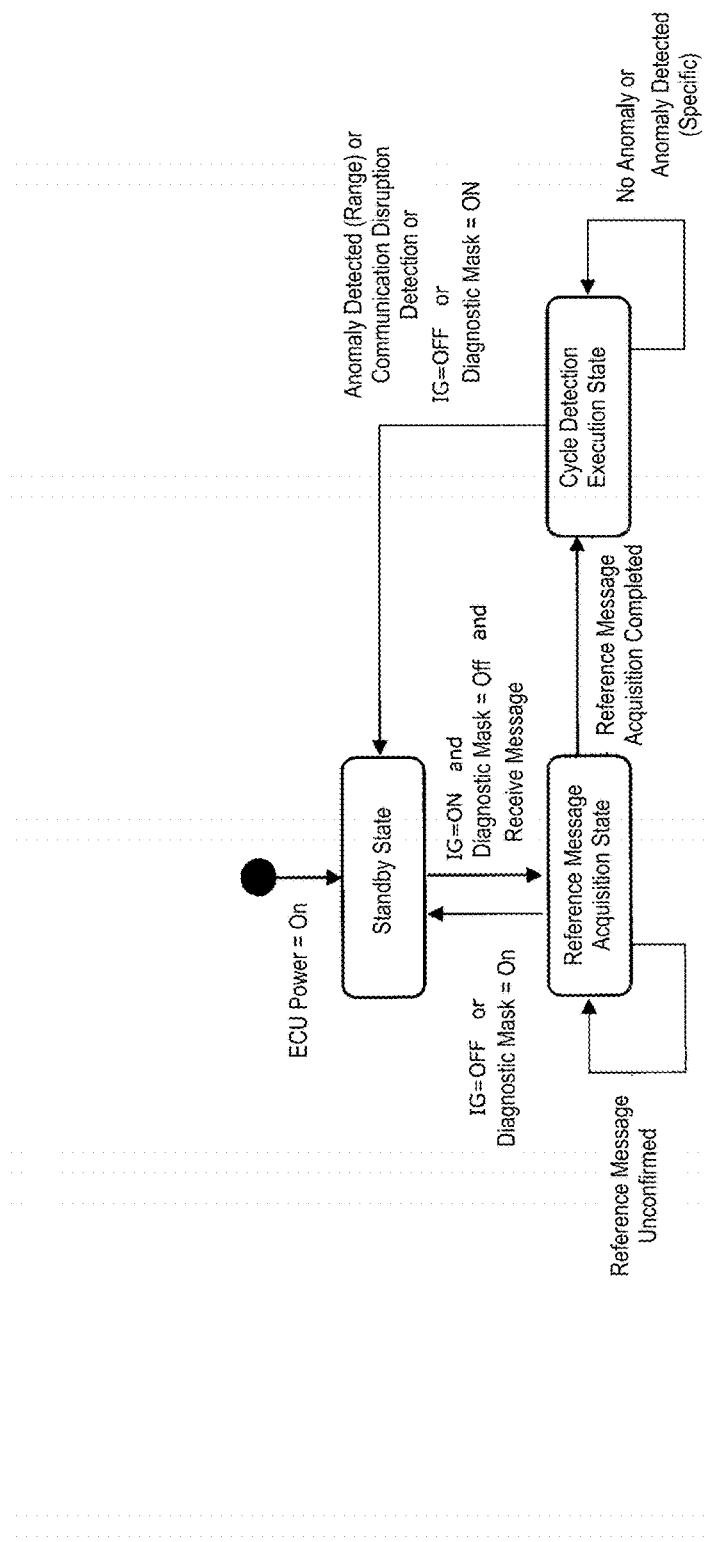
FIG. 13 is an illustrative diagram relating to state transition of the processing unit of the in-vehicle apparatus.

FIG. 13 is an illustrative diagram relating to state transition of the processing unit of the in-vehicle apparatus. The processing unit 20 of the in-vehicle apparatus 2 transitions between a plurality of states, similarly to Embodiment 1, in the process of performing the determination processing. The plurality of states include, for example, a standby state in which standby processing is performed during the diagnostic mask period or the like, a reference data reception state (reference message acquisition state) for receiving data to serve as a basis when specifying the normal cycle range, and a determination execution state (cycle detection execution state) for determining the validity of data received based on the specified normal cycle range.

The processing unit 20 of the in-vehicle apparatus 2 enters the standby state directly after power supply (ECU power supply) of the in-vehicle apparatus 2 is turned on, for example. The processing unit 20 of the in-vehicle apparatus 2, in the standby state, transitions to the reference data reception state (reference message acquisition state), due the IG switch 6 being turned on, the diagnostic mask period being completed (diagnostic mask being turned off), and the data initially received being acquired.

The processing unit 20 of the in-vehicle apparatus 2 maintains the reference data reception state (reference message acquisition state) while the reference data has yet to be confirmed (reference message unconfirmed), that is, until data of the same type received later that will serve as reference data (reference message) is acquired. The processing unit 20 of the in-vehicle apparatus 2, in the reference data reception state, transitions to the standby state, when the IG switch 6 is turned off or when the diagnostic mask period is started (diagnostic mask is turned on). If reference data (data of the same type received later) is received in the reference data reception state, the processing unit 20 of the in-vehicle apparatus 2 transitions to the determination execution state (cycle detection execution state).

The processing unit 20 of the in-vehicle apparatus 2, in the determination execution state (cycle detection execution state), maintains the determination execution state (cycle detection execution state) while anomalous data is not detected or if specifically anomalous data is detected. The processing unit 20 of the in-vehicle apparatus 2, in the determination execution state (cycle detection execution state), transitions to the standby state, if range anomalous data is detected, if communication disruption is detected, or if the diagnostic mask period is started (diagnostic mask is turned on).

Figure 14:
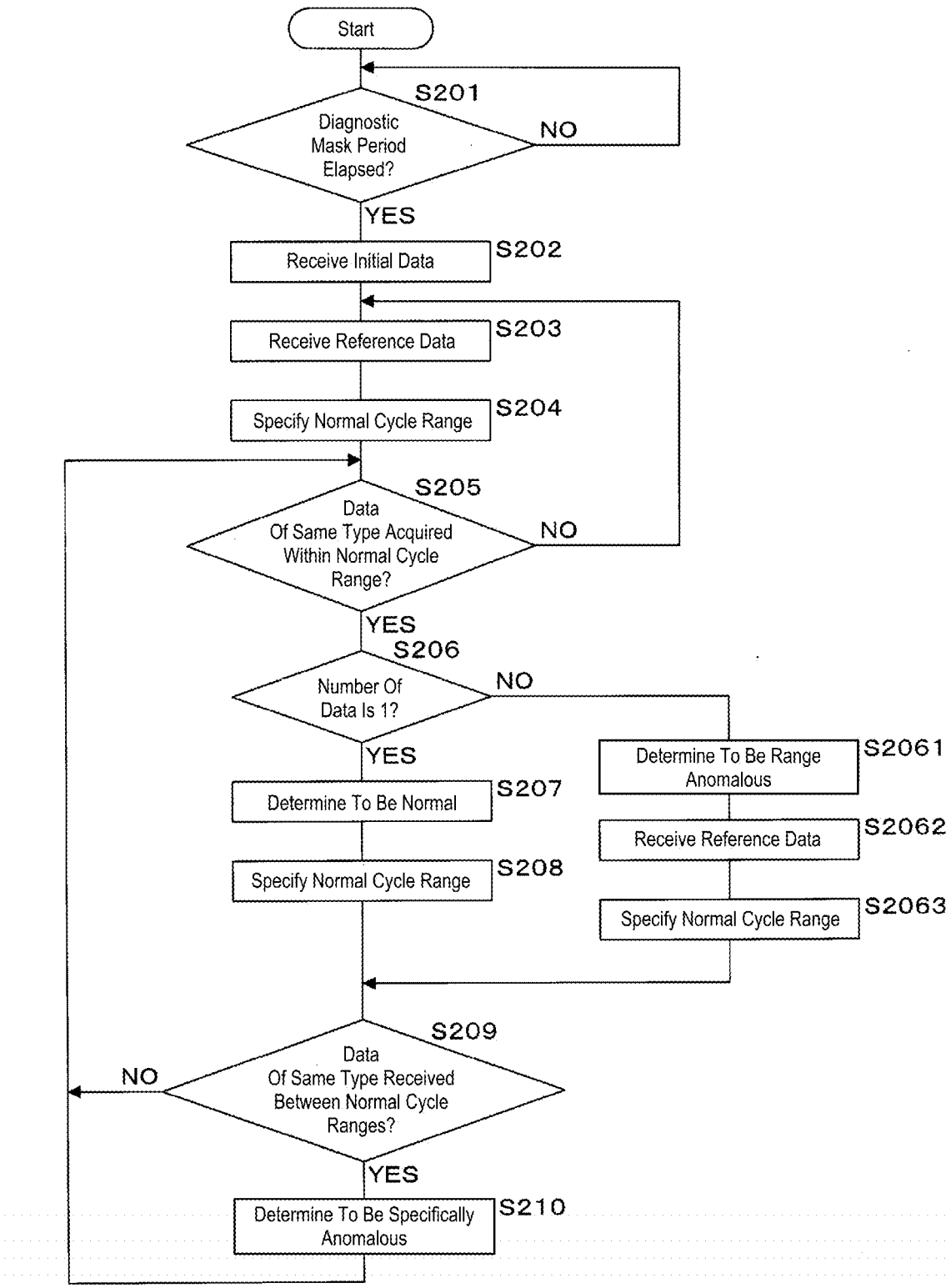
FIG. 14 is a flowchart illustrating processing by the processing unit of the in-vehicle apparatus.

FIG. 14 is a flowchart illustrating processing by the processing unit of the in-vehicle apparatus 2. The processing unit 20 of the in-vehicle apparatus 2 routinely performs the following processing when the vehicle C has been started (IG switch 6 is on), for example.

The processing unit 20 of the in-vehicle apparatus 2 determines whether the diagnostic mask period has elapsed, when the IG switch 6 is turned on (S201). The diagnostic mask period is determined in advance as a period in which anomaly detection is not performed on the in-vehicle apparatus 2 that is installed in the vehicle C, and this period is stored in the storage unit 21 of the in-vehicle apparatus 2, for example. If the diagnostic mask period has not elapsed (S201: NO), the processing unit 20 of the in-vehicle apparatus 2 performs standby processing, by performing loop processing in order to execute the processing of S201 again, for example, and maintains the standby state.

If the diagnostic mask period has elapsed (S201: YES), the processing unit of the in-vehicle apparatus 2 receives the initial data after the elapse of the diagnostic mask period (S202). The processing unit 20 of the in-vehicle apparatus 2 acquires the data initially received after the diagnostic mask period has elapsed. As described above, since a plurality of types of data (a plurality of data types) are received, the processing unit 20 of the in-vehicle apparatus 2 acquires the data initially received for each data type. The processing unit 20 of the in-vehicle apparatus 2 is in the standby state during the diagnostic mask period, and transitions from the standby state to the reference data reception state after the reception time point of the data initially received.

The processing unit 20 of the in-vehicle apparatus 2 receives reference data (S203). The processing unit 20 of the in-vehicle apparatus 2 acquires the data initially received as the processing of S202 and data (data received later) of the same type as the initial data and received directly after the initial data. The processing unit 20 of the in-vehicle apparatus 2 thereby acquires two pieces of data of the same type received consecutively, after the elapse of the diagnostic mask period. If the reception interval of the two pieces of data of the same type received consecutively is within the normal cycle range, the processing unit 20 of the in-vehicle apparatus 2 sets the reference data, by receiving (acquiring) the data received later as reference data. The processing unit 20 of the in-vehicle apparatus 2 may be configured to store the two pieces of data (data received earlier and data received later) of the same type received consecutively in the storage unit 21.

The processing unit 20 of the in-vehicle apparatus 2 performs the processing from S204 to S210, similarly to the processing of S102 to S108 in Embodiment 1. The processing unit 20 of the in-vehicle apparatus 2 maintains the reference data reception state for receiving data to serve as a basis when specifying the normal cycle range until the processing from S201 to S203 is completed. After completing the processing of S203, the processing unit 20 of the in-vehicle apparatus 2 transitions to the determination execution state for determining the validity of the received data based on the specified normal cycle range, when performing the processing of S204. The processing unit 20 of the in-vehicle apparatus 2 transitions to the reference data reception state, the determination execution state or the standby state, according to the respective processing content when performing the series of processing from S204. The processing unit 20 of the in-vehicle apparatus 2 continuously performs relay processing such as transferring received data to another communication line 41 (CAN bus) in accordance with the routing map, regardless of whether the processing unit 20 is in the reference data reception state, the determination execution state, or the standby state.

The processing unit 20 of the in-vehicle apparatus 2, when in the reference data reception state, prohibits processing relating to anomaly detection, such as determining the validity of received data, and processing for a saving security log or the like (attack detection log data) that is based on detection results in the determination execution state, and does not perform this processing. This processing is prohibited for each type of data (data type) that is received. The processing unit 20 of the in-vehicle apparatus 2, when in the determination execution state, stores information that depends on the mode of the anomaly, such as a security log that is based on detection results in the determination execution state, in a volatile storage area. When the IG switch 6 is turned off, for example, the processing unit 20 of the in-vehicle apparatus 2 saves (copies) the security log or the like stored in the volatile storage area to a nonvolatile storage area. The processing unit 20 of the in-vehicle apparatus 2 may be configured to determine an upper limit value of the number of security logs to be stored (saved), and, when the number of security logs that are saved exceeds the upper limit value, save the most recent security log by overwriting the oldest log.

The embodiments disclosed here should be considered illustrative in all respects and not restrictive. The scope of the present disclosure is defined not by the foregoing purport but by the claims, and all changes that come within the meaning and range of equivalency of the claims are intended to be embraced therein.

The invention claimed is:

1. An in-vehicle apparatus configured to be connected to an in-vehicle network installed in a vehicle, comprising:
a processing unit configured to perform processing relating to determining a validity of data flowing through the in-vehicle network,
wherein the processing unit:
receives a plurality of data flowing through the in-vehicle network,
derives a reception interval of when data of a same type is consecutively received, out of the received plurality of data,
determines, based on the reception interval and a normal cycle range specified on a basis of a reception time point of data received earlier out of the data of the same type received consecutively, the validity of data received later out of the data of the same type received consecutively,
transitions between a plurality of operating states, the plurality of operating states including a reference data reception state for receiving data to serve as a basis when specifying the normal cycle range, and a determination execution state for determining the validity of received data based on the specified normal cycle range,
if data of the same type is not received within the normal cycle range, transitions to the reference data reception state, and specifies a next normal cycle range on a basis of the reception time point of data of the same type received after the normal cycle range, and
transitions to the determination execution state.

2. The in-vehicle apparatus according to claim 1, wherein the normal cycle range is a range in which upper and lower limit values are set, with a transmission cycle determined based on a type of the data set as a reference value.

3. The in-vehicle apparatus according to claim 1,
wherein the processing unit:
determines that the data received later out of the data of the same type received consecutively is normal, if the reception interval is within the normal cycle range specified on a basis of the reception time point of the data received earlier out of the data of the same type received consecutively, and
determines that the data received later out of the data of the same type received consecutively is anomalous, if the reception interval is not within the normal cycle range.

4. The in-vehicle apparatus according to claim 1,
wherein, if one piece of data of the same type is received within the normal cycle range, the processing unit determines that the one piece of data received within the normal cycle range is normal, and
if a plurality of data of the same type are received within the normal cycle range, the processing unit determines that one or more of the data included in the plurality of data received within the normal cycle range are anomalous.

5. The in-vehicle apparatus according to claim 1, wherein, if a plurality of data of the same type are received within the normal cycle range, the processing unit specifies the next normal cycle range on a basis of the reception time point of data of the same type received after the normal cycle range.

6. The in-vehicle apparatus according to claim 1, wherein, if data of the same type as the data received earlier is received between a previous normal cycle range used in determination of the data received earlier and a current normal cycle range specified on a basis of the reception time point of the data received earlier, the processing unit determines that the data of the same type is anomalous.

7. The in-vehicle apparatus according to claim 1, wherein, if one piece of data of the same type as the data received earlier is received within the normal cycle range specified on a basis of the reception time point of the data received earlier, the processing unit determines that the data of the same type is normal, and specifies the next normal cycle range on a basis of the reception time point of the data determined to be normal.

8. The in-vehicle apparatus according to claim 1, wherein the processing unit does not perform anomaly detection in the reference data reception state.

9. The in-vehicle apparatus according to claim 1, wherein the processing unit does not save a security log in the reference data reception state.

10. The in-vehicle apparatus according to claim 1, wherein, if it is determined that the received data is anomalous, the processing unit stores information that depends on a mode of the anomaly in an accessible predetermined storage area.

11. The in-vehicle apparatus according to claim 10,
wherein the accessible predetermined storage area is a volatile storage area, and
when an IG switch of the vehicle is turned off, the processing unit transfers the information stored in the volatile storage area to an accessible predetermined nonvolatile storage area.

12. The in-vehicle apparatus according to claim 1, wherein, when specifying the normal cycle range on a basis of the reception time point of received data, the processing unit stores the type and reception time point of the data serving as the basis in association with each other in an accessible predetermined storage area.

13. The in-vehicle apparatus according to claim 1, wherein, when an IG switch of the vehicle is turned on, the processing unit consecutively receives, after a predetermined diagnostic mask period has elapsed, data initially received and data of the same type as the data initially received, and
if the reception interval of the consecutively received data is within the normal cycle range specified on a basis of the data initially received, the processing unit specifies the next normal cycle range on a basis of the reception time point of the data received later out of the consecutively received data.

14. The in-vehicle apparatus according to claim 1,
wherein, if a plurality of data of the same type are received within the normal cycle range, the processing unit determines that one or more of the data included in the plurality of data received within the normal cycle range are anomalous,
if the reception interval is not within the normal cycle range, the processing unit determines that the data received later out of the data of the same type received consecutively is anomalous, and
the processing unit differentiates a determination code for when it is determined that one or more of data included in the plurality of data are anomalous from a determination code for when it is determined that the reception interval is not within the normal cycle range.

15. A computer program for causing a computer to execute processing for:
receiving a plurality of data flowing through an in-vehicle network installed in a vehicle;
deriving a reception interval of when data of a same type is consecutively received, out of the received plurality of data;
determining, based on the reception interval and a normal cycle range specified on a basis of a reception time point of data received earlier out of the data of the same type received consecutively, a validity of data received later out of the data of the same type received consecutively;
transiting between a plurality of operating states, the plurality of operating states including a reference data reception state for receiving data to serve as a basis when specifying the normal cycle range, and a determination execution state for determining the validity of received data based on the specified normal cycle range;
if data of the same type is not received within the normal cycle range, transitioning to the reference data reception state, and specifying a next normal cycle range on a basis of the reception time point of data of the same type received after the normal cycle range; and
transitioning to the determination execution state.

16. An information processing method for causing a computer to execute processing for:
receiving a plurality of data flowing through an in-vehicle network installed in a vehicle;
deriving a reception interval of when data of a same type is consecutively received, out of the received plurality of data; and
determining, based on the reception interval and a normal cycle range specified on a basis of a reception time point of data received earlier out of the data of the same type received consecutively, a validity of data received later out of the data of the same type received consecutively;
transiting between a plurality of operating states, the plurality of operating states including a reference data reception state for receiving data to serve as a basis when specifying the normal cycle range, and a determination execution state for determining the validity of received data based on the specified normal cycle range;
if data of the same type is not received within the normal cycle range, transitioning to the reference data reception state, and specifying a next normal cycle range on a basis of the reception time point of data of the same type received after the normal cycle range; and
transitioning to the determination execution state.

* * * * *